(12) United States Patent
Dimou et al.

(10) Patent No.: US 12,184,421 B2
(45) Date of Patent: Dec. 31, 2024

(54) HYBRID AUTOMATIC REPEAT REQUEST CODEBOOK TRANSMISSION

(71) Applicant: QUALCOMM Incorporated, San Diego, CA (US)

(72) Inventors: Konstantinos Dimou, San Francisco, CA (US); Jing Sun, San Diego, CA (US); Peter Gaal, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/650,624

(22) Filed: Feb. 10, 2022

(65) Prior Publication Data
US 2023/0308217 A1 Sep. 28, 2023

(51) Int. Cl.
*H04L 1/18* (2023.01)
*H04L 1/1812* (2023.01)

(52) U.S. Cl.
CPC ................. *H04L 1/1812* (2013.01)

(58) Field of Classification Search
CPC .............. H04L 1/1812; H04L 1/1822; H04L 1/1835; H04L 1/1858; H04L 1/1829; H04L 1/16; H04L 1/18; H04W 2/1284; H04W 72/1289
See application file for complete search history.

(56) References Cited

U.S. PATENT DOCUMENTS

| | | | | |
|---|---|---|---|---|
| 2012/0014478 A1* | 1/2012 | Gotman | ................ | H04L 1/0052 375/316 |
| 2020/0252168 A1* | 8/2020 | Kim | .................. | H04W 72/1268 |
| 2020/0382997 A1* | 12/2020 | Nemeth | ............... | H04B 7/0478 |
| 2022/0095363 A1* | 3/2022 | Elshafie | ................ | H04L 1/1861 |

OTHER PUBLICATIONS

HARQ-ACK enhancement for Rel-17 URLLC France Oct. 1, 2021 (Year: 2021).*
International Search Report and Written Opinion—PCT/US2023/061942—ISA/EPO—Aug. 1, 2023.
Partial International Search Report—PCT/US2023/061942—ISA/EPO—Jun. 9, 2023.

(Continued)

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may determine a quantity of hybrid automatic repeat request (HARQ) codebooks capable of being stored by the UE, a maximum amount of HARQ codebook data capable of being stored by the UE, or a maximum HARQ codebook size capable of being stored by the UE, and may transmit, to a network node, capability information that indicates the quantity of HARQ codebooks capable of being stored by the UE, the maximum amount of HARQ codebook data capable of being stored by the UE, or the maximum HARQ codebook size capable of being stored by the UE. Numerous other aspects are described.

31 Claims, 16 Drawing Sheets

(56) References Cited

OTHER PUBLICATIONS

Qualcomm Incorporated: "HARQ-ACK Enhancement for IOT and URLLC", 3GPP TSG RAN WG1 #107-e, R1-2112209, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, 31 pages, pp. 1-9, XP052075315, pp. 16-18.
Rapporteur (Nokia) : "List of Agreements of Rel-17 URLLC/IIot WI (Post RAN1#107bis-e)", 3GPP TSG-RAN WG1 Meeting #107bis-e, R1-2200778, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 26, 2022, 57 Pages, XP052103688, pp. 10-11.
Vivo: "HARQ-ACK Enhancements for Rel-17 URLLC", 3GPP TSG RAN WG1#106b-e, R1-2108966, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 16 Pages, XP052057801, pp. 14, 15.

* cited by examiner

HYBRID AUTOMATIC REPEAT REQUEST CODEBOOK TRANSMISSION

FIELD OF THE DISCLOSURE

Aspects of the present disclosure generally relate to wireless communication and to techniques and apparatuses for hybrid automatic repeat request codebook transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining a quantity of hybrid automatic repeat request (HARQ) codebooks capable of being stored by the UE, a maximum amount of HARQ codebook data capable of being stored by the UE, or a maximum HARQ codebook size capable of being stored by the UE. The method may include transmitting, to a network node, capability information that indicates the quantity of HARQ codebooks capable of being stored by the UE, the maximum amount of HARQ codebook data capable of being stored by the UE, or the maximum HARQ codebook size capable of being stored by the UE.

Some aspects described herein relate to a method of wireless communication performed by a UE. The method may include storing a HARQ codebook. The method may include obtaining an updated HARQ codebook. The method may include storing the updated HARQ codebook using a first-in-first-out (FIFO) storage process, a last-in-first-out (LIFO) storage process, or based at least in part on a size of the HARQ codebook.

Some aspects described herein relate to a method of wireless communication performed by a network node. The method may include obtaining first HARQ codebook content associated with a HARQ process identifier of a HARQ codebook. The method may include obtaining second HARQ codebook content associated with the HARQ process identifier. The method may include receiving, from a UE, retransmitted HARQ codebook content associated with the HARQ process identifier. The method may include selectively updating the HARQ codebook content associated with the HARQ process identifier.

Some aspects described herein relate to a method of wireless communication performed by a UE. The method may include receiving, from a network node, a retransmission request for a HARQ codebook. The method may include selectively transmitting the HARQ codebook based at least in part on whether HARQ content associated with the HARQ codebook has been updated.

Some aspects described herein relate to an apparatus for wireless communication performed by a UE. The apparatus may include a memory and one or more processors, coupled to the memory. The one or more processors may be configured to determine a quantity of HARQ codebooks capable of being stored by the UE, a maximum amount of HARQ codebook data capable of being stored by the UE, or a maximum HARQ codebook size capable of being stored by the UE. The one or more processors may be configured to transmit, to a network node, capability information that indicates the quantity of HARQ codebooks capable of being stored by the UE, the maximum amount of HARQ codebook data capable of being stored by the UE, or the maximum HARQ codebook size capable of being stored by the UE.

Some aspects described herein relate to an apparatus for wireless communication performed by a UE. The apparatus may include a memory and one or more processors, coupled to the memory. The one or more processors may be configured to store a HARQ codebook. The one or more processors may be configured to obtain an updated HARQ codebook. The one or more processors may be configured to store the updated HARQ codebook using a FIFO storage process, a LIFO storage process, or based at least in part on a size of the HARQ codebook.

Some aspects described herein relate to an apparatus for wireless communication performed by a network node. The apparatus may include a memory and one or more processors, coupled to the memory. The one or more processors may be configured to obtain first HARQ codebook content associated with a HARQ process identifier of a HARQ codebook. The one or more processors may be configured to obtain second HARQ codebook content associated with the HARQ process identifier. The one or more processors may be configured to receive, from a UE, retransmitted HARQ codebook content associated with the HARQ process identifier. The one or more processors may be configured to selectively update the HARQ codebook content associated with the HARQ process identifier.

Some aspects described herein relate to an apparatus for wireless communication performed by a UE. The apparatus may include a memory and one or more processors, coupled to the memory. The one or more processors may be configured to receive, from a network node, a retransmission request for a HARQ codebook. The one or more processors may be configured to selectively transmit the HARQ codebook based at least in part on whether HARQ content associated with the HARQ codebook has been updated.

Some aspects described herein relate to a non-transitory computer-readable medium that stores a set of instructions for wireless communication by a UE. The set of instructions, when executed by one or more processors of the UE, may cause the UE to determine a quantity of HARQ codebooks capable of being stored by the UE, a maximum amount of HARQ codebook data capable of being stored by the UE, or a maximum HARQ codebook size capable of being stored by the UE. The set of instructions, when executed by one or more processors of the UE, may cause the UE to transmit, to a network node, capability information that indicates the quantity of HARQ codebooks capable of being stored by the UE, the maximum amount of HARQ codebook data capable of being stored by the UE, or the maximum HARQ codebook size capable of being stored by the UE.

Some aspects described herein relate to a non-transitory computer-readable medium that stores a set of instructions for wireless communication by a UE. The set of instructions, when executed by one or more processors of the UE, may cause the UE to store a HARQ codebook. The set of instructions, when executed by one or more processors of the UE, may cause the UE to obtain an updated HARQ codebook. The set of instructions, when executed by one or more processors of the UE, may cause the UE to store the updated HARQ codebook using a FIFO storage process, a LIFO storage process, or based at least in part on a size of the HARQ codebook.

Some aspects described herein relate to a non-transitory computer-readable medium that stores a set of instructions for wireless communication by a network node. The set of instructions, when executed by one or more processors of the network node, may cause the network node to obtain first HARQ codebook content associated with a HARQ process identifier of a HARQ codebook. The set of instructions, when executed by one or more processors of the network node, may cause the network node to obtain second HARQ codebook content associated with the HARQ process identifier. The set of instructions, when executed by one or more processors of the network node, may cause the network node to receive, from a UE, retransmitted HARQ codebook content associated with the HARQ process identifier. The set of instructions, when executed by one or more processors of the network node, may cause the network node to selectively update the HARQ codebook content associated with the HARQ process identifier.

Some aspects described herein relate to a non-transitory computer-readable medium that stores a set of instructions for wireless communication by a UE. The set of instructions, when executed by one or more processors of the UE, may cause the UE to receive, from a network node, a retransmission request for a HARQ codebook. The set of instructions, when executed by one or more processors of the UE, may cause the UE to selectively transmit the HARQ codebook based at least in part on whether HARQ content associated with the HARQ codebook has been updated.

Some aspects described herein relate to an apparatus for wireless communication. The apparatus may include means for determining a quantity of HARQ codebooks capable of being stored by the UE, a maximum amount of HARQ codebook data capable of being stored by the UE, or a maximum HARQ codebook size capable of being stored by the UE. The apparatus may include means for transmitting, to a network node, capability information that indicates the quantity of HARQ codebooks capable of being stored by the apparatus, the maximum amount of HARQ codebook data capable of being stored by the apparatus, or the maximum HARQ codebook size capable of being stored by the apparatus.

Some aspects described herein relate to an apparatus for wireless communication. The apparatus may include means for storing a HARQ codebook. The apparatus may include means for obtaining an updated HARQ codebook. The apparatus may include means for storing the updated HARQ codebook using a FIFO storage process, a LIFO storage process, or based at least in part on a size of the HARQ codebook.

Some aspects described herein relate to an apparatus for wireless communication. The apparatus may include means for obtaining first HARQ codebook content associated with a HARQ process identifier of a HARQ codebook. The apparatus may include means for obtaining second HARQ codebook content associated with the HARQ process identifier. The apparatus may include means for receiving, from a UE, retransmitted HARQ codebook content associated with the HARQ process identifier. The apparatus may include means for selectively updating the HARQ codebook content associated with the HARQ process identifier.

Some aspects described herein relate to an apparatus for wireless communication. The apparatus may include means for receiving, from a network node, a retransmission request for a HARQ codebook. The apparatus may include means for selectively transmitting the HARQ codebook based at least in part on whether HARQ content associated with the HARQ codebook has been updated.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
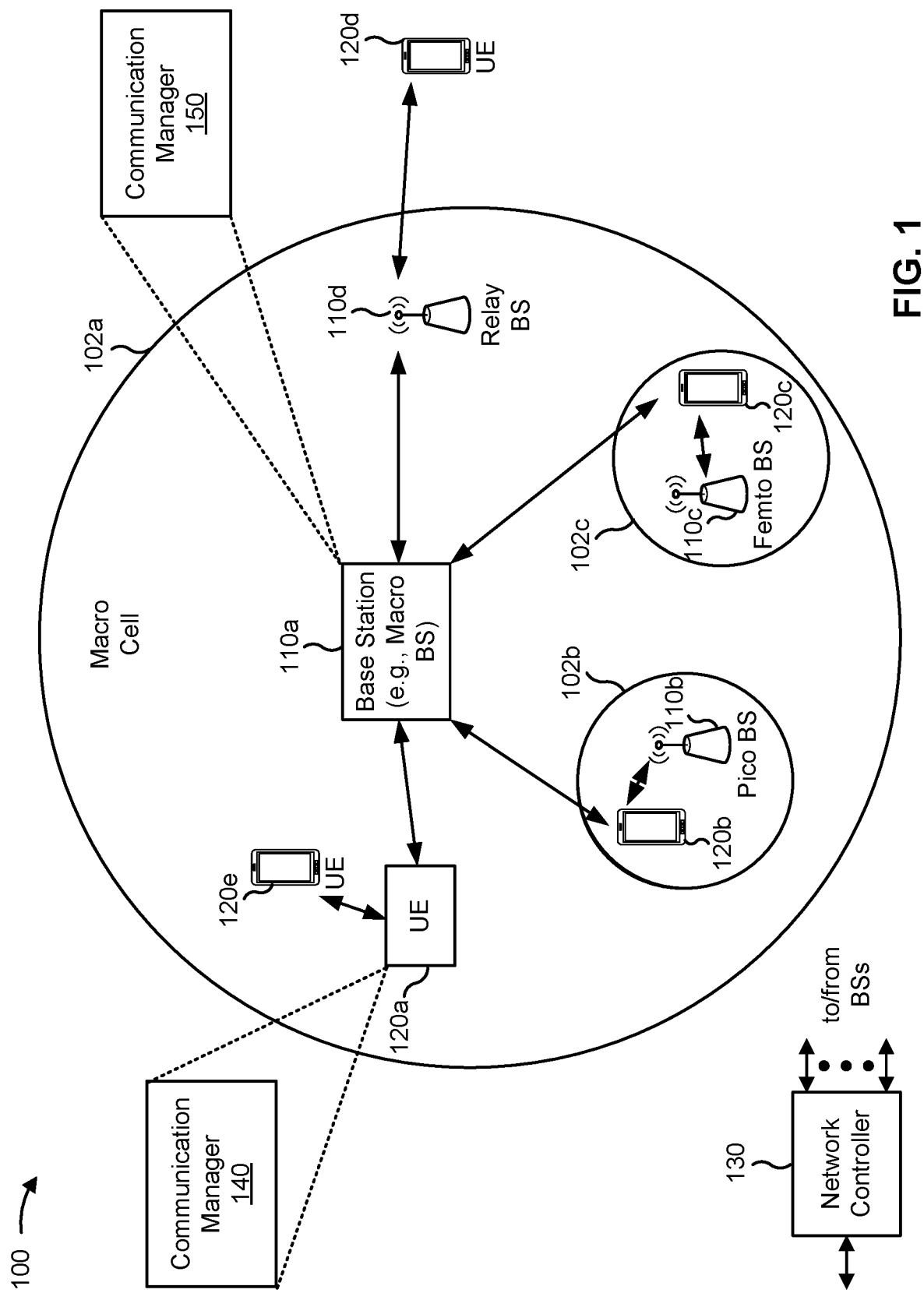
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine a quantity of hybrid automatic repeat request (HARQ) codebooks capable of being stored by the UE, a maximum amount of HARQ codebook data capable of being stored by the UE, or a maximum HARQ codebook size capable of being stored by the UE; and transmit, to a network node, capability information that indicates the quantity of HARQ codebooks capable of being stored by the UE, the maximum amount of HARQ codebook data capable of being stored by the UE, or the maximum HARQ codebook size capable of being stored by the UE. Additionally, or alternatively, the communication manager 140 may perform one or more other operations described herein.

In some aspects, the communication manager 140 may store a HARQ codebook; obtain an updated HARQ codebook; and store the updated HARQ codebook using a first-in-first-out (FIFO) storage process, a last-in-first-out (LIFO) storage process, or based at least in part on a size of the HARQ codebook. Additionally, or alternatively, the communication manager 140 may perform one or more other operations described herein.

In some aspects, the communication manager 140 may receive, from a network node, a retransmission request for a HARQ codebook; and selectively transmit the HARQ codebook based at least in part on whether HARQ content associated with the HARQ codebook has been updated. Additionally, or alternatively, the communication manager 140 may perform one or more other operations described herein.

In some aspects, the network node 805 may include a communication manager 150. As described in more detail elsewhere herein, the communication manager 150 may obtain first HARQ codebook content associated with a HARQ process identifier of a HARQ codebook; obtain second HARQ codebook content associated with the HARQ process identifier; receive, from the UE 120, retransmitted HARQ codebook content associated with the HARQ process identifier; and selectively update the HARQ codebook content associated with the HARQ process identifier. Additionally, or alternatively, the communication manager 150 may perform one or more other operations described herein.

As indicated above, FIG. 1 is provided as an example. Other examples may differ from what is described with regard to FIG. 1.

Figure 2:
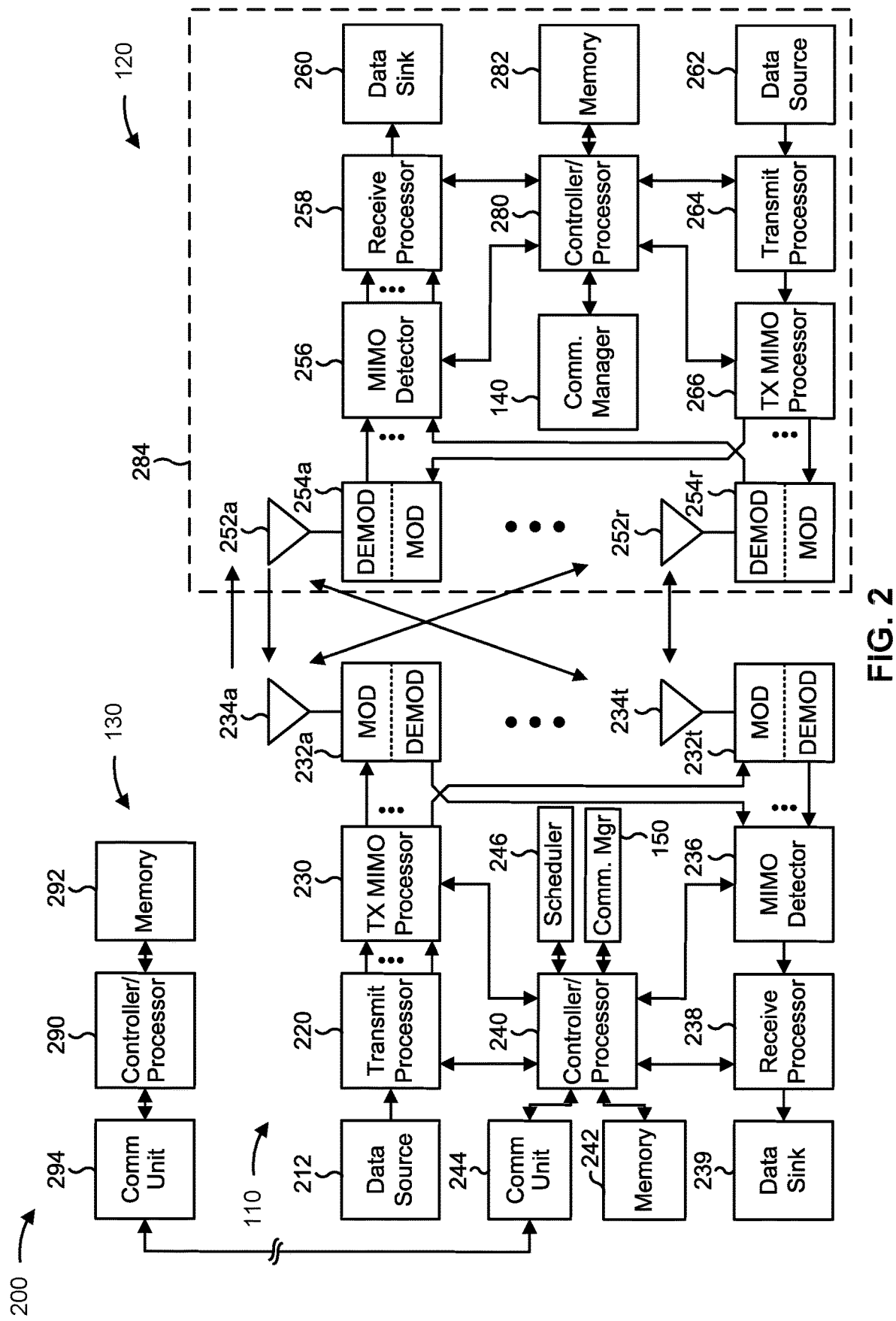
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-16).

The controller/processor 240 of the base station 110, the controller/processor 280 of the UE 120, and/or any other component(s) of FIG. 2 may perform one or more techniques associated with HARQ codebook transmission, as described in more detail elsewhere herein. In some aspects, the network node 805 described herein is the disaggregated base station 110, is included in the disaggregated base station 110, or includes one or more components of the disaggregated base station 110 shown in FIGS. 2 and 3. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, the UE 120 includes means for determining a quantity of HARQ codebooks capable of being stored by the UE, a maximum amount of HARQ codebook data capable of being stored by the UE, or a maximum HARQ codebook size capable of being stored by the UE; and/or means for transmitting, to a network node, capability information that indicates the quantity of HARQ codebooks capable of being stored by the UE, the maximum amount of HARQ codebook data capable of being stored by the UE, or the maximum HARQ codebook size capable of being stored by the UE. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for storing a HARQ codebook; means for obtaining an updated HARQ codebook; and/or means for storing the updated HARQ codebook using a FIFO storage process, a LIFO storage process, or based at least in part on a size of the HARQ codebook. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 805 includes means for obtaining first HARQ codebook content associated with a HARQ process identifier of a HARQ codebook; means for obtaining second HARQ codebook content associated with the HARQ process identifier; means for receiving, from a UE, retransmitted HARQ codebook content associated with the HARQ process identifier; and/or means for selectively updating the HARQ codebook content associated with the HARQ process identifier. In some aspects, the means for the network node 805 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for receiving, from a network node, a retransmission request for a HARQ codebook; and/or means for selectively transmitting the HARQ codebook based at least in part on whether HARQ content associated with the HARQ codebook has been updated. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
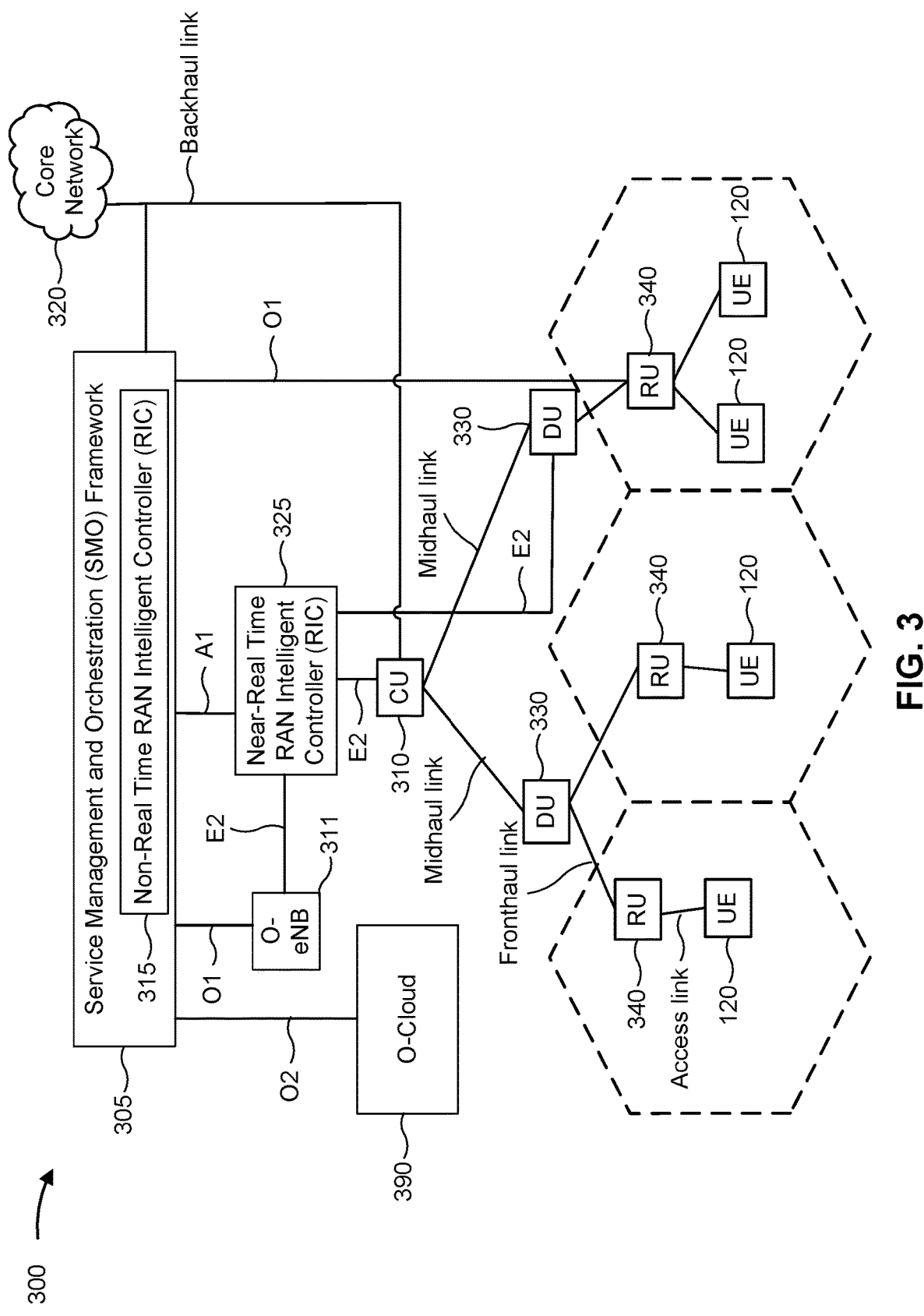
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via 01) or via creation of RAN management policies (such as A1 policies).

As described herein, a network node associated with the disaggregated base station architecture may selectively update hybrid automatic repeat request (HARQ) codebook content.

As indicated above, FIG. 3 is provided as an example. Other examples may differ from what is described with regard to FIG. 3.

Figure 4:
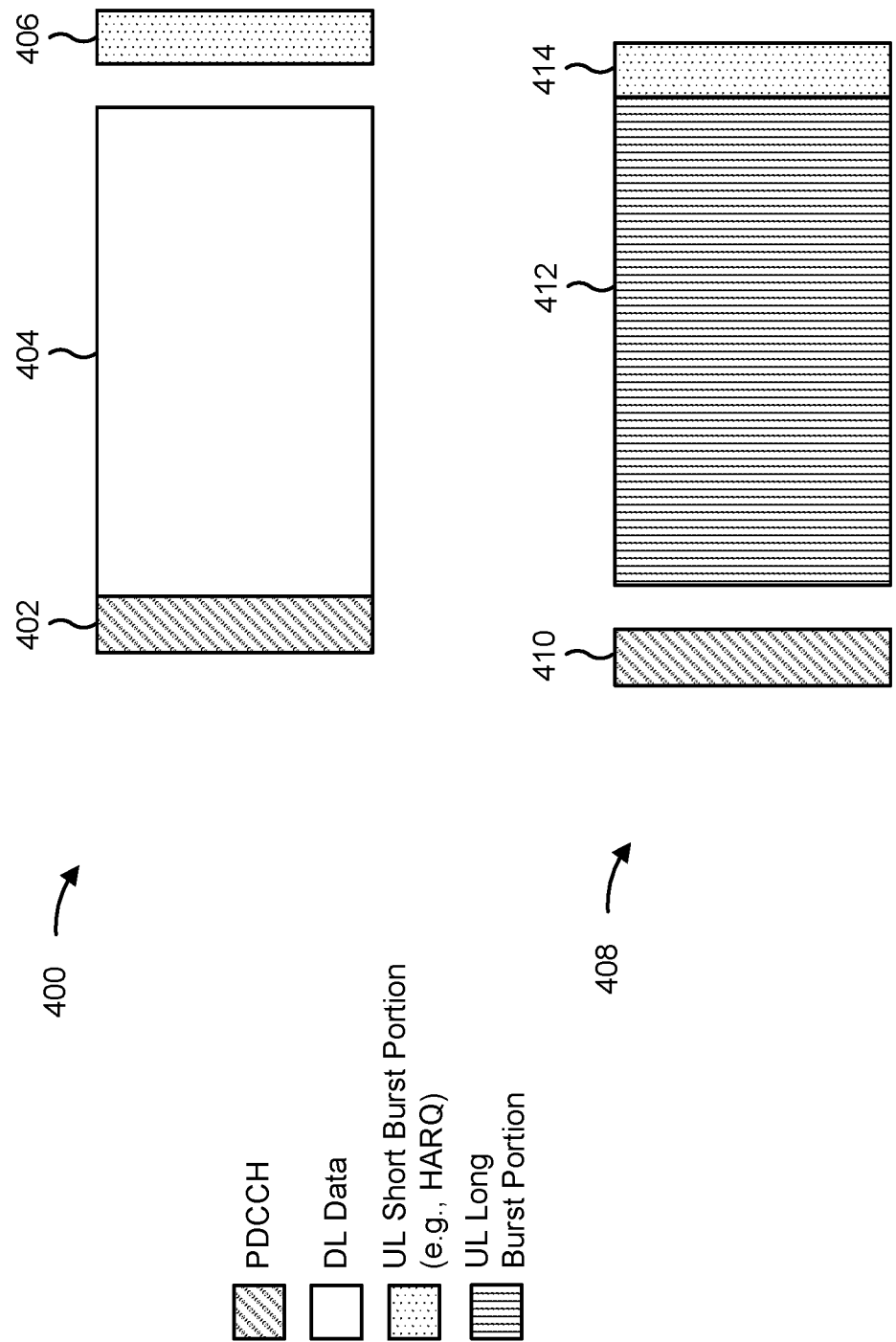
FIG. 4 is a diagram illustrating an example of a downlink-centric slot or communication structure and an uplink-centric slot or communication structure, in accordance with the present disclosure.

FIG. 4 is a diagram showing an example downlink (DL)-centric slot or communication structure 400 and an uplink (UL)-centric slot or communication structure 410, in accordance with of the present disclosure. The DL-centric slot (or wireless communication structure) 400 may include a control portion 402 during which the scheduling entity (for example, UE or BS) transmits various scheduling information or control information corresponding to various portions of the DL-centric slot to the subordinate entity (for example, UE). The control portion 402 may exist in the initial or beginning portion of the DL-centric slot 400. In some configurations, the control portion 402 may be a physical DL control channel PDCCH, as indicated in FIG. 4. In some aspects, the control portion 402 may include legacy PDCCH information, shortened PDCCH (sPDCCH) information), a control format indicator (CFI) value (for example, carried on a physical control format indicator channel (PC-FICH)), one or more grants (for example, downlink grants, or uplink grants), among other examples, or combinations thereof.

The DL-centric slot 400 may also include a DL data portion 404 during which the scheduling entity (for example, UE or BS) transmits DL data to the subordinate entity (for example, UE) using communication resources utilized to communicate DL data. The DL data portion 404 may sometimes be referred to as the payload of the DL-centric slot 400. In some configurations, the DL data portion 404 may be a physical downlink shared channel (PDSCH).

The DL-centric slot 400 may also include an UL short burst portion 406 during which the subordinate entity (for example, UE) transmits reference signals or feedback to the scheduling entity (for example, UE or BS) using communication resources utilized to communicate UL data. The UL short burst portion 406 may sometimes be referred to as an UL burst, an UL burst portion, a common UL burst, a short burst, an UL short burst, a common UL short burst, a common UL short burst portion, or various other suitable terms. In some aspects, the UL short burst portion 406 may include one or more reference signals. Additionally or alternatively, the UL short burst portion 406 may include feedback information corresponding to various other portions of the DL-centric slot 400. For example, the UL short burst portion 406 may include feedback information corresponding to the control portion 402 or the data portion 404. Non-limiting examples of information that may be included in the UL short burst portion 406 include an acknowledgement (ACK) signal (for example, a physical uplink control channel (PUCCH) ACK, a physical uplink shared channel (PUSCH) ACK, or an immediate ACK), a negative acknowledgement (NACK) signal (for example, a PUCCH NACK, a PUSCH NACK, or an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, or various other suitable types of information. The UL short burst portion 406 may include additional or alternative information, such as information pertaining to RACH procedures, scheduling requests, and various other suitable types of information. In some cases, the HARQ indicator may be associated with a HARQ codebook. The HARQ codebook may be used by the UE 120 to provide feedback to a network node (e.g., the network node 805). For example, the network node 805 may transmit a DL data transmission (e.g., via the PDSCH), and the UE 120 may transmit an ACK message or a NACK message (e.g., via the PUSCH or PUCCH) using one or more HARQ processes of the HARQ codebook.

As illustrated in FIG. 4, the end of the DL data portion 404 may be separated in time from the beginning of the UL short burst portion 406. This time separation may sometimes be referred to as a gap, a guard period, a guard interval, or various other suitable terms. This separation provides time for the switch-over from DL communication (for example, reception operation by the subordinate entity (for example, BS or UE)) to UL communication (for example, transmission by the subordinate entity (for example, UE)). The foregoing provides some examples of a DL-centric wireless communication structure, but alternative structures having similar features may exist without deviating from the aspects described herein.

The UL-centric slot (or wireless communication structure) 408 may include a control portion 410. The control portion 410 may exist in the initial or beginning portion of the UL-centric slot 408. The control portion 410 in may be similar to the control portion 402 described above with reference to the DL-centric slot 400. The UL-centric slot 408 may also include an UL long burst portion 412. The UL long burst portion 412 may sometimes be referred to as the payload of the UL-centric slot 408. "UL portion" may refer to the communication resources utilized to communicate UL data from the subordinate entity (for example, UE) to the scheduling entity (for example, UE or BS). In some configurations, the control portion 410 may be a physical DL control channel PDCCH.

As illustrated, the end of the control portion 410 may be separated in time from the beginning of the UL long burst portion 412. This time separation may sometimes be referred to as a gap, guard period, guard interval, or various other suitable terms. This separation provides time for the switch-over from DL communication (for example, reception operation by the scheduling entity) to UL communication (for example, transmission operation by the scheduling entity).

The UL-centric slot 408 may also include an UL short burst portion 414. The UL short burst portion 414 may be similar to the UL short burst portion 406 described above with reference to the DL-centric slot 400, and may include any of the information described above. The foregoing is merely one example of an UL-centric wireless communication structure, and alternative structures having similar features may exist without deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

In some cases, the UE 120 may receive a request for HARQ codebook content associated with a canceled HARQ codebook. As described in more detail herein, the UE 120 may transmit current HARQ codebook content or canceled HARQ codebook content associated with the canceled HARQ codebook.

As indicated above, FIG. 4 is provided as an example. Other examples may differ from what is provided with regard to FIG. 4.

Figure 5:
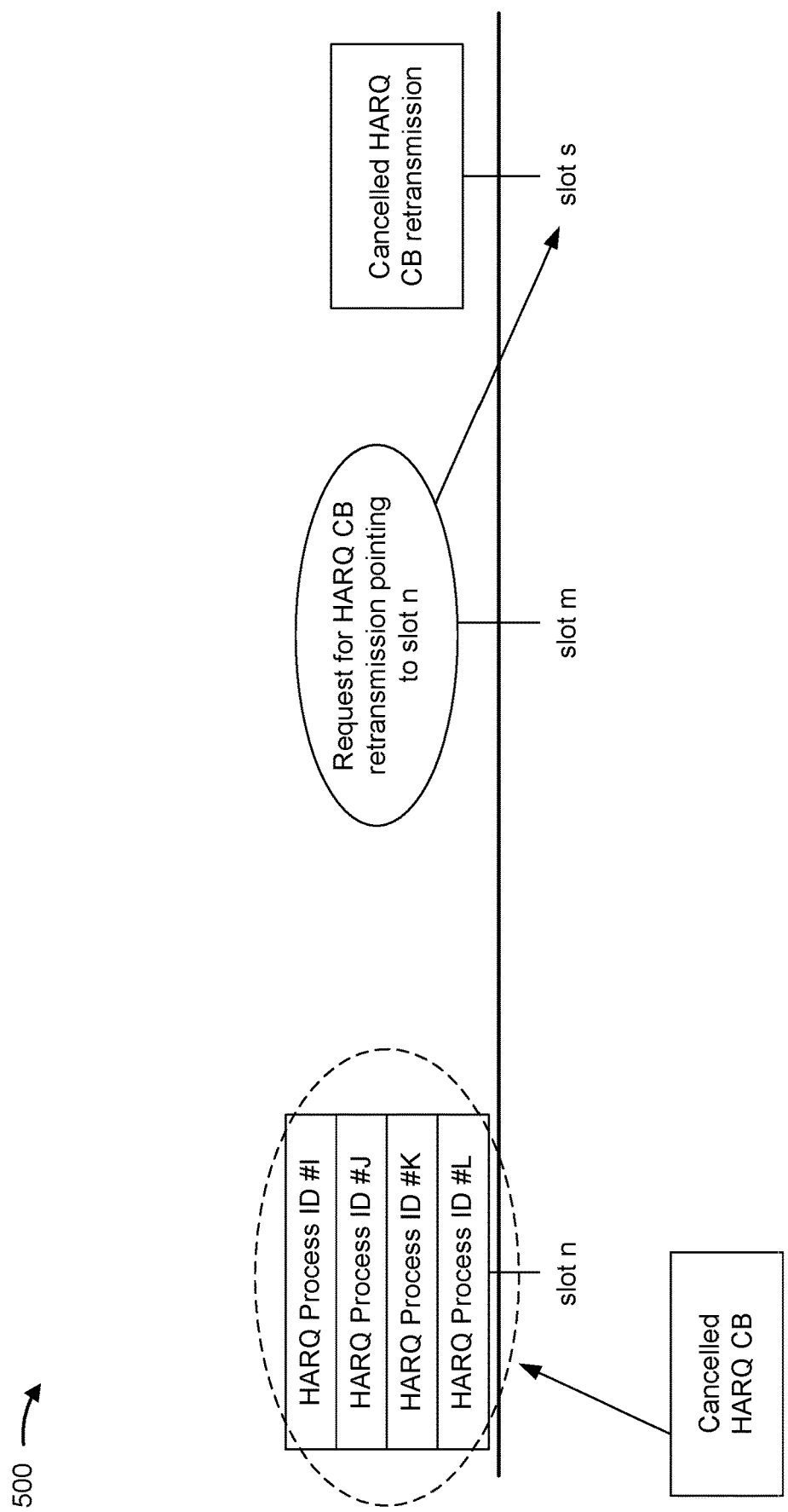
FIG. 5 is a diagram illustrating an example associated with a hybrid automatic repeat request (HARQ) codebook retransmission offset, in accordance with the present disclosure.

FIG. 5 is a diagram illustrating an example 500 of a HARQ codebook retransmission offset, in accordance with the present disclosure.

In some cases, the UE 120 may use a Type 3 HARQ-ACK codebook for a HARQ-ACK retransmission. The UE 120 may transmit the HARQ-ACK retransmission to a network node (e.g., the network node 805 described below) based at least in part on the Type 3 HARQ-ACK codebook. The UE 120 may use the HARQ-ACK codebook based at least in part on a semi-persistent scheduling (SPS) HARQ collision with a downlink, a low priority (LP) HARQ dropped internally due to an intra-UE multiplexing, a HARQ multiplexing onto a physical uplink shared channel where the PUSCH is canceled via a cancellation indication (CI), and/or a HARQ not decoded at the network node 805 (e.g., due to poor channel conditions). The Type 3 HARQ-ACK codebook may be associated with a size and content, such as a set of HARQ process identifiers. The network node 805 may configure, for the UE 120, the size and content of the Type 3 HARQ-ACK codebook via RRC signaling. In some cases, the network node 805 may simultaneously configure up to a number (e.g., eight) of Type 3 HARQ-ACK codebooks via the RRC signaling. The network node 805 may transmit, to the UE 120, downlink control information (DCI) to indicate a requested Type 3 HARQ-ACK codebook.

For the HARQ-ACK retransmission, the Type 3 HARQ-ACK codebook (or enhanced Type 3 HARQ-ACK codebook) may be supported with a smaller size as compared to earlier version Type 3 HARQ-ACK codebooks. A codebook size of a single triggered Type 3 HARQ-ACK codebook may be based at least in part on an RRC configuration. A construction of the Type 3 HARQ-ACK codebook may use HARQ processes as a basis (e.g., order according to HARQ process identifiers and serving cells). In other words, the Type 3 HARQ-ACK codebook may be based at least in part on HARQ process identifiers. In some cases, one-shot triggering by a downlink assignment of the HARQ-ACK retransmission on a physical uplink control channel (PUCCH) resource may be supported on a PUCCH resource other than a Type 2 or Type 3 HARQ-ACK codebook, but may be subject to separate UE capabilities.

For the Type 3 HARQ-ACK codebook, a dynamic selection may be supported based at least in part on an indication in a triggering DCI of the Type 3 HARQ-ACK codebook. The Type 3 HARQ-ACK codebook may be defined by the RRC configuration. In some cases, a plurality of downlink HARQ processes (e.g., all downlink HARQ processes) of a plurality of configured component carriers (e.g., all component carriers) may be configured as one Type 3 HARQ-ACK codebook. Further, the UE 120 may transmit, to the network node 805, capability signaling (e.g., a value ranging from 1 to X, or a value selected from a set of 1, 2, 4, and 8) indicating a maximum quantity of supported simultaneously configured Type 3 HARQ-ACK codebooks that are able to be dynamically indicated to the UE 120.

In some cases, for one-shot HARQ retransmission (e.g., HARQ-ACK retransmission) via the PUCCH, the triggering DCI may dynamically indicate an offset (e.g., HARQ_retx_offset) which may be used to define the offset between the PUCCH slot (or sub-slot) of the triggering DCI, and the PUCCH slot (or sub-slot) of the HARQ-ACK codebook to be retransmitted. In some cases, the PUCCH slot (or sub-slot) n of the HARQ-ACK codebook to be retransmitted may be determined by one of the following:

Alt 1: n=m−HARQ_retx_offset, where
  m is the slot (or sub-slot) that contains the triggering DCI, and
  HARQ_retx_offset is the HARQ retransmission offset.

As shown in the example 500, at slot n, the UE 120 may receive a HARQ codebook having the following HARQ process identifiers: HARQ Process ID #I, HARQ Process ID #J, HARQ Process ID #K, and HARQ Process ID #L. At slot m, the UE 120 may receive a request for HARQ codebook retransmission. The request for the HARQ codebook retransmission may point to the slot n. For example, the request may indicate the following: HARQ_retx_offset=m−n. The request for the HARQ codebook may request for the UE 120 to perform the retransmission at slot s. At slot s, the UE 120 may attempt to retransmit the canceled HARQ codebook. Additional details regarding this feature are described in more detail below.

In some cases, if one or more HARQ process identifiers of the requested HARQ codebook to be retransmitted are no longer available (e.g., the content of the HARQ process included in the canceled HARQ codebook is replaced by new HARQ bits), the UE 120 may transmit the new content of the HARQ process being updated.

As indicated above, FIG. 5 is provided as an example. Other examples may differ from what is described with regard to FIG. 5.

Figure 6:
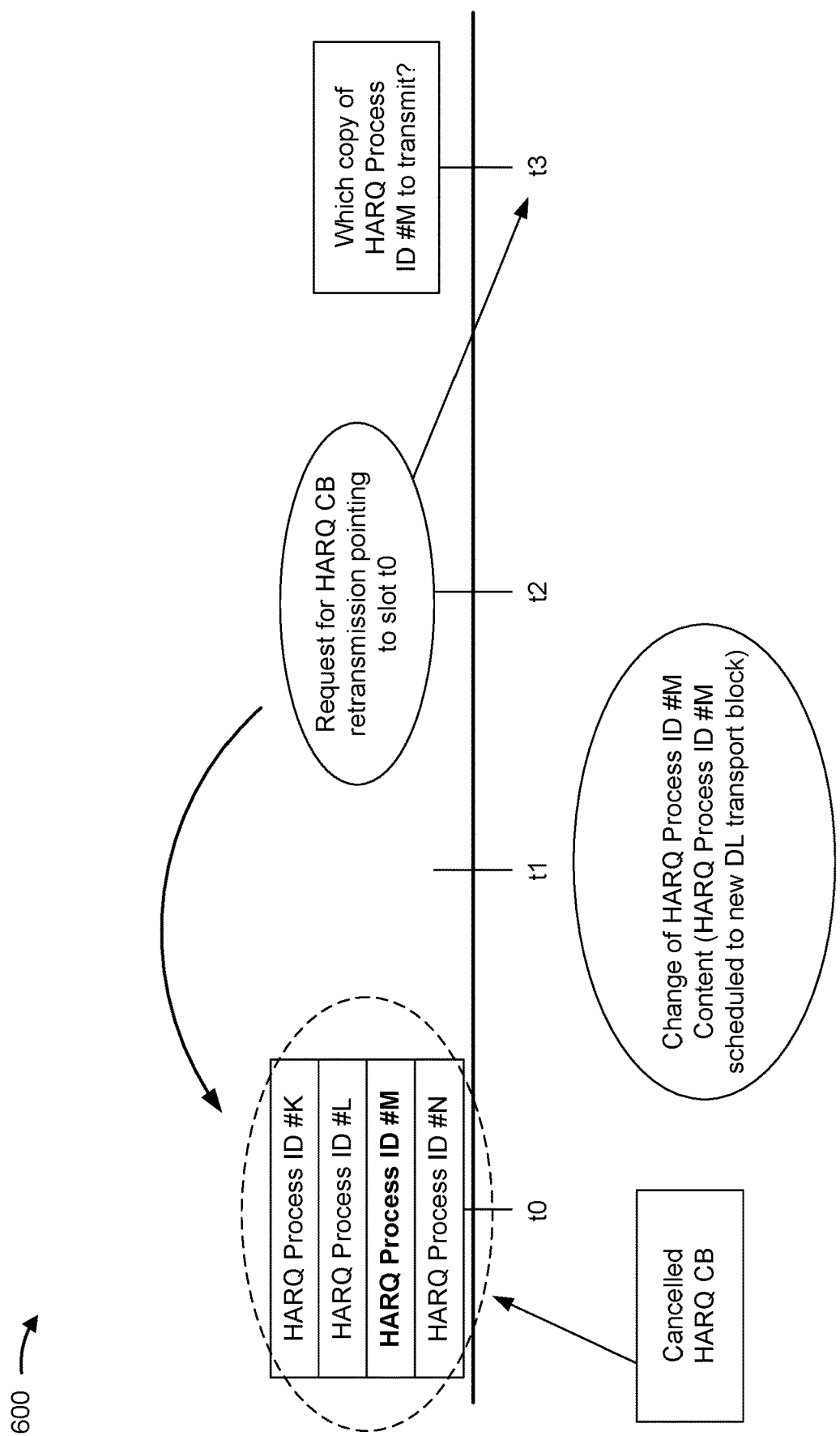
FIG. 6 is a diagram illustrating a first example associated with HARQ codebook retransmission for a canceled HARQ codebook, in accordance with the present disclosure.

FIG. 6 is a diagram illustrating a first example 600 associated with HARQ codebook retransmission for a canceled HARQ codebook, in accordance with the present disclosure.

At time t0, the UE 120 may obtain a HARQ codebook having the following HARQ process identifiers: HARQ Process ID #K, HARQ Process ID #L, HARQ Process ID #M, and HARQ Process ID #N. Each of the HARQ process identifiers may be associated with HARQ codebook content (e.g., an ACK or NACK). For example, HARQ Process ID #K may be associated with an ACK, HARQ Process ID #L may be associated with an ACK, HARQ Process ID #M may be associated with a NACK, and HARQ Process ID #N may be associated with a NACK.

At time t1, the UE 120 may obtain an indication that the HARQ codebook content associated with a HARQ process identifier has changed. For example, the UE 120 may receive an indication that the HARQ codebook content associated with HARQ Process ID #M has changed from a NACK to an ACK, and/or that the HARQ Process ID #M has been scheduled to a new downlink transport block.

At time t2, the UE 120 may receive a request for HARQ codebook retransmission pointing to the slot at time t0. The request for the HARQ codebook retransmission may indicate for the UE 120 to retransmit the HARQ codebook (from the slot at time t0) at time t3. However, the UE 120 may not be able to determine whether to transmit the previous content for the HARQ Process ID #M (e.g., the NACK), or the updated content for the HARQ Process ID #M (e.g., the ACK). Similarly, the network node 805 may not be able to determine whether the received content for the HARQ Process ID #M is current. This may lead to incorrect information being transmitted by the UE 120 and/or incorrect information being received by the network node 805.

Techniques and apparatuses are described herein for HARQ codebook transmission. In some aspects, the UE 120 may transmit capability information associated with a HARQ codebook retransmission. For example, the UE 120 may determine a quantity of HARQ codebooks capable of being stored by the UE 120, a maximum amount of HARQ codebook data capable of being stored by the UE 120, or a maximum HARQ codebook size capable of being stored by the UE 120, and may transmit capability information that indicates the quantity of HARQ codebooks capable of being stored by the UE 120, the maximum amount of HARQ codebook data capable of being stored by the UE 120, or the maximum HARQ codebook size capable of being stored by the UE 120. In some aspects, the UE 120 may store HARQ content for a HARQ codebook, receive updated HARQ content for the HARQ codebook, and store the updated HARQ content for the HARQ codebook using a FIFO storage process, a LIFO storage process, or based at least in part on a size of the HARQ codebook. In some aspects, the network node 805 may obtain an indication of first HARQ codebook content associated with a HARQ process identifier, obtain an indication of second HARQ codebook content associated with the HARQ process identifier, receive an indication of retransmitted HARQ codebook content associated with the HARQ process identifier, and selectively update the HARQ codebook content associated with the HARQ process identifier.

As described above, the UE 120 may not be able to determine whether to retransmit the previous HARQ codebook content for a HARQ process identifier, or the updated content for the HARQ process identifier, in response to a HARQ codebook retransmission request. Similarly, the network node 805 may not be able to determine whether the received HARQ codebook content for the HARQ process is the correct HARQ codebook content. This may lead to incorrect information being transmitted by the UE 120 and/or incorrect information being received by the network node 805. Using the techniques and apparatuses described herein, the UE 120 may transmit capability information associated with storing and updating the HARQ codebook content. Additionally, or alternatively, the network node 805 may selectively update the HARQ codebook content based at least in part on an update status of the HARQ process identifier. This may reduce the likelihood of the incorrect HARQ codebook content being stored by the UE 120 and the network node 805.

As indicated above, FIG. 6 is provided as an example. Other examples may differ from what is described with regard to FIG. 6.

Figure 7:
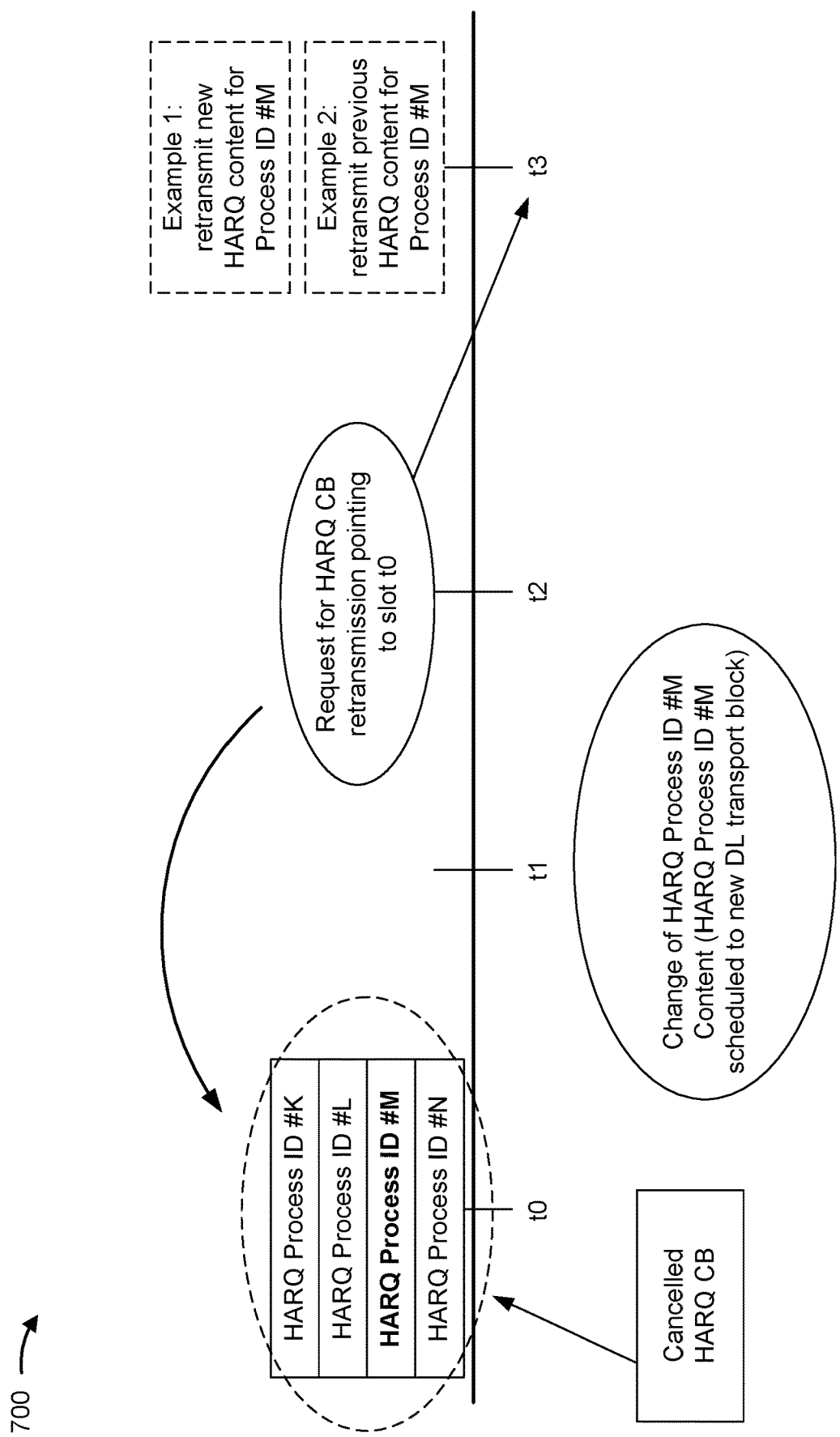
FIG. 7 is a diagram illustrating a second example associated with HARQ codebook retransmission for a canceled HARQ codebook, in accordance with the present disclosure.

FIG. 7 is a diagram illustrating a second example 700 associated with HARQ codebook retransmission for a canceled HARQ codebook, in accordance with the present disclosure.

As described herein, the UE 120 may be configured to retransmit HARQ codebook content. For example, the UE 120 may retransmit HARQ codebook content for one or more HARQ process identifiers associated with a HARQ codebook.

In a first example, the retransmitted HARQ codebook may contain the updated HARQ content (e.g., the new HARQ content) for the HARQ process identifiers of the HARQ codebook. In this example, the UE 120 may store the HARQ process identifier for each HARQ process of the HARQ codebook. In some aspects, the UE 120 may store the HARQ codebook content (e.g., the ACK or NACK) associated with the HARQ process identifiers. In some aspects, the UE 120 may not store the HARQ codebook content associated with the HARQ process identifiers. Upon receiving a HARQ codebook retransmission request, the UE 120 may obtain the list of HARQ process identifiers contained in the requested HARQ codebook, and may obtain the HARQ codebook content associated with the HARQ process identifiers. The UE 120 may retransmit the HARQ process identifiers and the associated HARQ codebook content.

In a second example, the retransmitted HARQ codebook may contain the previous HARQ codebook content (e.g., the canceled HARQ content) for the HARQ codebook. In this example, the UE 120 may store the HARQ codebook content (e.g., the ACK or NACK) associated with each of the HARQ processes of the HARQ codebook. In some aspects, the UE 120 may store the HARQ process identifiers associated with the HARQ processes. In some aspects, the UE 120 may not store the HARQ process identifiers associated with the HARQ processes. Upon receiving a HARQ codebook retransmission request, the UE 120 may obtain the corresponding HARQ codebook content, and may transmit the HARQ codebook content (e.g., with or without the associated HARQ process identifiers).

In some aspects, the UE 120 may transmit the latest (e.g., updated) HARQ codebook content for each HARQ process included in the requested HARQ codebook. For example, the DL packet occupying the HARQ process may have already been retransmitted since the HARQ process storing feedback for this DL packet is now occupied by another DL packet. In some aspects, the UE 120 may save the list of HARQ process identifiers included in each transmitter's HARQ codebook for a certain number (e.g., up to N) of previous HARQ codebooks. In some aspects, the UE 120 may transmit this capability to the network. For example, as described in more detail below, the UE 120 may transmit capability information that indicates a number of HARQ codebooks capable of being stored by the UE 120. In some aspects, the UE 120 may transmit a copy of the already saved HARQ codebook when the slot offset value indicates that there is no new content in the requested HARQ codebook.

In some aspects, the first example for HARQ codebook retransmission may require fewer memory resources of the UE 120 (e.g., since the UE 120 does not save the HARQ codebook content) as compared to the second example for HARQ codebook retransmission. However, the second example may be simpler (e.g., may require fewer processing resources) if the content of the requested HARQ codebook has not changed (e.g., from the previous or canceled content, to the new or updated content). In some aspects, the network node 805 may need to keep track of the HARQ process identifiers that have changed. For example, the network node 805 may need to keep track of the HARQ process identifiers for which the content has changed from the previous or canceled content (e.g., NACK) to the new or updated content (e.g., ACK). Additional details regarding these features are described below.

As indicated above, FIG. 7 is provided as an example. Other examples may differ from what is described with regard to FIG. 7.

Figure 8:
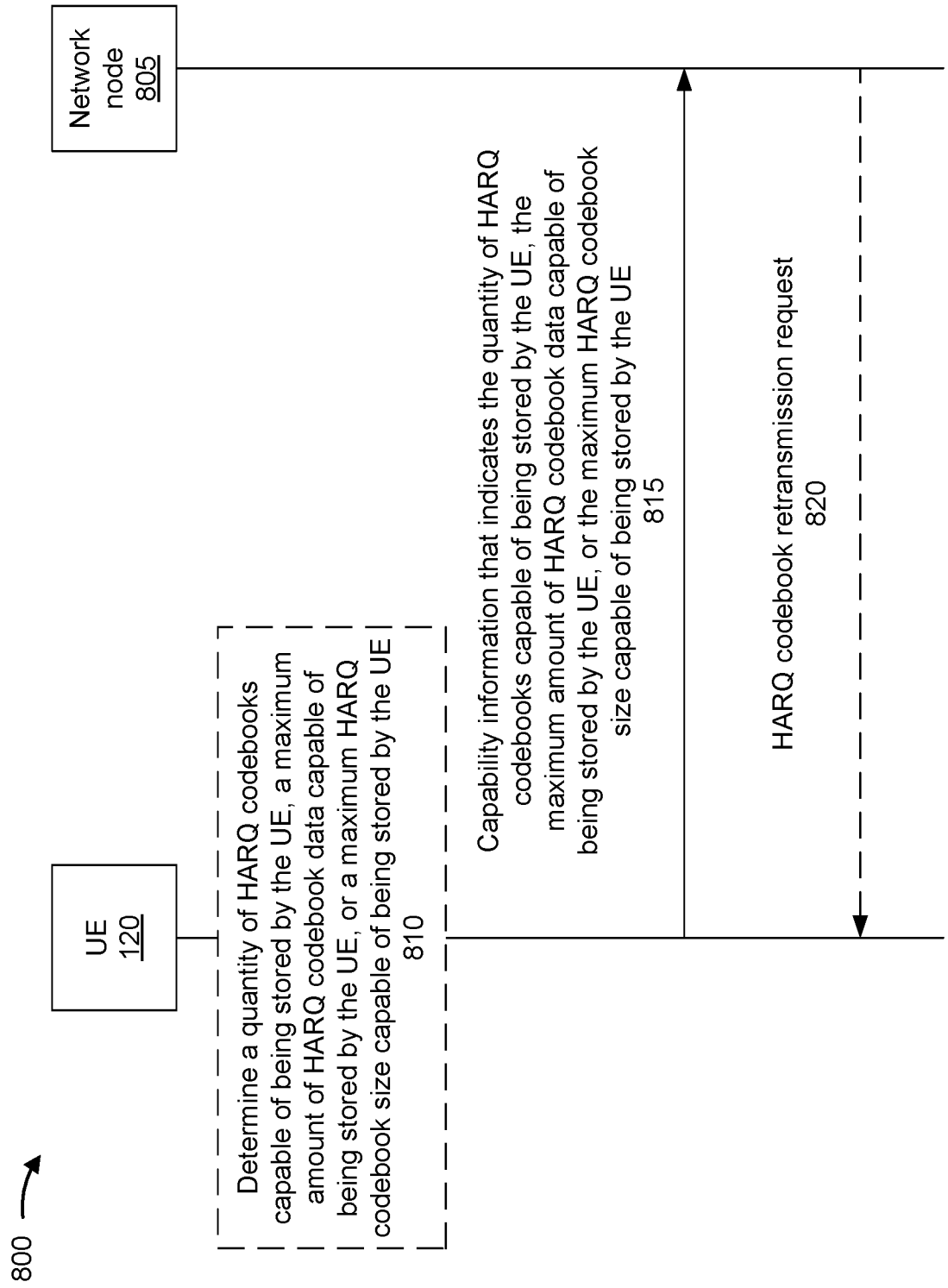
FIG. 8 is a diagram illustrating an example associated with capability information for HARQ codebook transmission, in accordance with the present disclosure.

FIG. 8 is a diagram illustrating an example 800 of capability information for HARQ codebook transmission, in accordance with the present disclosure. A UE, such as the UE 120, may communicate with the network node 805. The network node 805 may include one or more features of the disaggregated base station described in connection with FIG. 3.

As shown in connection with reference number 810, the UE 120 may determine a quantity of HARQ codebooks capable of being stored by the UE 120, a maximum amount of HARQ codebook data capable of being stored by the UE 120, and/or a maximum HARQ codebook size capable of being stored by the UE 120.

In some aspects, the determination may be based at least in part on a storage capability of the UE 120. For example, the UE 120 may determine the quantity of HARQ codebooks, the maximum amount of HARQ codebook data, or the maximum HARQ codebook size, capable of being stored by the UE 120, based at least in part on a total storage capability of the UE 120.

In some aspects, the determination may be based at least in part on an available storage capability of the UE 120. For example, the UE 120 may determine the quantity of HARQ codebooks, the maximum amount of HARQ codebook data, or the maximum HARQ codebook size, capable of being stored by the UE 120, based at least in part on an available storage capability of the UE 120.

In some aspects, the determination may be based at least in part on a configuration of the UE 120. For example, determining the quantity of HARQ codebooks, the maximum amount of HARQ codebook data, or the maximum HARQ codebook size may include obtaining configuration information that indicates the quantity of HARQ codebooks, the maximum amount of HARQ codebook data, or the maximum HARQ codebook size.

In some aspects, the UE 120 may determine the quantity of HARQ codebooks, the maximum amount of HARQ codebook data, or the maximum HARQ codebook size, capable of being stored by the UE 120, for each of a first storage type and a second storage type. Additional details regarding the first storage type and the second storage type are provided below.

As shown in connection with reference number 815, the UE 120 may transmit, and the network node 805 may receive, capability information associated with the HARQ codebooks.

In some aspects, the UE 120 may transmit the capability information based at least in part on a request from the network node 805 for the capability information. In some aspects, the UE 120 may transmit the capability information prior to the network node 805 requesting HARQ codebook retransmission. In some aspects, the UE 120 may transmit the capability information based at least in part on receiving a HARQ codebook retransmission request (e.g., the HARQ codebook retransmission request described in connection with reference number 820).

In some aspects, the capability information may indicate the quantity of HARQ codebooks capable of being stored by the UE 120. For example, the UE 120 may indicate a maximum quantity of HARQ codebooks capable of being stored for the first storage type and/or a maximum quantity of HARQ codebooks capable of being stored for the second storage type.

In some aspects, the capability information may indicate the maximum amount of HARQ codebook data (e.g., for all HARQ codebooks) capable of being stored by the UE 120. For example, the UE 120 may indicate a maximum amount of HARQ codebook data capable of being stored for the first storage type and/or a maximum amount of HARQ codebook data capable of being stored for the second storage type.

In some aspects, the capability information may indicate the maximum HARQ codebook size (e.g., for an individual HARQ codebook) capable of being stored by the UE 120. For example, the UE 120 may indicate a maximum HARQ codebook size capable of being stored for the first storage type and/or a maximum HARQ codebook size capable of being stored for the second storage type.

In some aspects, the capability information may indicate whether the UE 120 supports the first storage type or the second storage type.

In some aspects, the first storage type may correspond to the first example described above in connection with FIG. 7. For example, the UE 120 may be configured to store the HARQ process identifiers for one or more of the HARQ processes associated with the HARQ codebook. The UE 120 may optionally store the HARQ codebook content (e.g., ACK or NACK) associated with each of the HARQ process identifiers.

In some aspects, the second storage type may correspond to the second example described above in connection with FIG. 7. For example, the UE 120 may be configured to store the HARQ codebook content for each of the HARQ codebooks. The UE 120 may optionally store the HARQ process identifiers (e.g., ACK or NACK) associated with the HARQ processes of the HARQ codebooks.

In some aspects, the UE 120 may store the ACK or NACK bits (e.g., the raw ACK or NACK bits). In some aspects, the UE 120 may store the HARQ process identifiers. In some aspects, the UE 120 may store the ACK or NACK bits and the HARQ process identifiers.

As described above, the UE 120 may transmit capability information for one or more of the first storage type and/or the second storage type. For example, the UE 120 may indicate a quantity of HARQ codebooks capable of being stored by the UE 120 based at least in part on the UE 120 using the first storage type. Additionally, or alternatively, the UE 120 may indicate a quantity (e.g., the same quantity, or a different quantity) of HARQ codebooks capable of being stored by the UE 120 based at least in part on the UE 120 using the second storage type.

As shown in connection with reference number 820, the network node 805 may transmit, and the UE 120 may receive, a HARQ codebook retransmission request based at least in part on the capability information.

In some aspects, the HARQ codebook retransmission process may be based at least in part on the first storage type. For example, the network node 805 may transmit, and the UE 120 may receive, a HARQ codebook retransmission request. The UE 120 may obtain one or more HARQ process identifiers contained in the requested HARQ codebook. The UE 120 may identify the HARQ codebook content associated with the one or more HARQ process identifiers. The UE 120 may transmit (e.g., retransmit) the HARQ codebook content associated with the one or more HARQ process identifiers. As described above, the retransmitted HARQ codebook content may include the updated (e.g., new) HARQ codebook content.

In some aspects, the HARQ codebook retransmission process may be based at least in part on the second storage type. For example, the network node 805 may transmit, and the UE 120 may receive, a HARQ codebook retransmission request. The UE 120 may identify the HARQ codebook content associated with each HARQ process identifier contained in the HARQ codebook. The UE 120 may transmit the stored HARQ codebook content (e.g., with or without the corresponding HARQ process identifiers). As described above, the retransmitted HARQ codebook content may include the previous (e.g., canceled) HARQ codebook content.

As indicated above, FIG. 8 is provided as an example. Other examples may differ from what is described with regard to FIG. 8.

Figure 9:
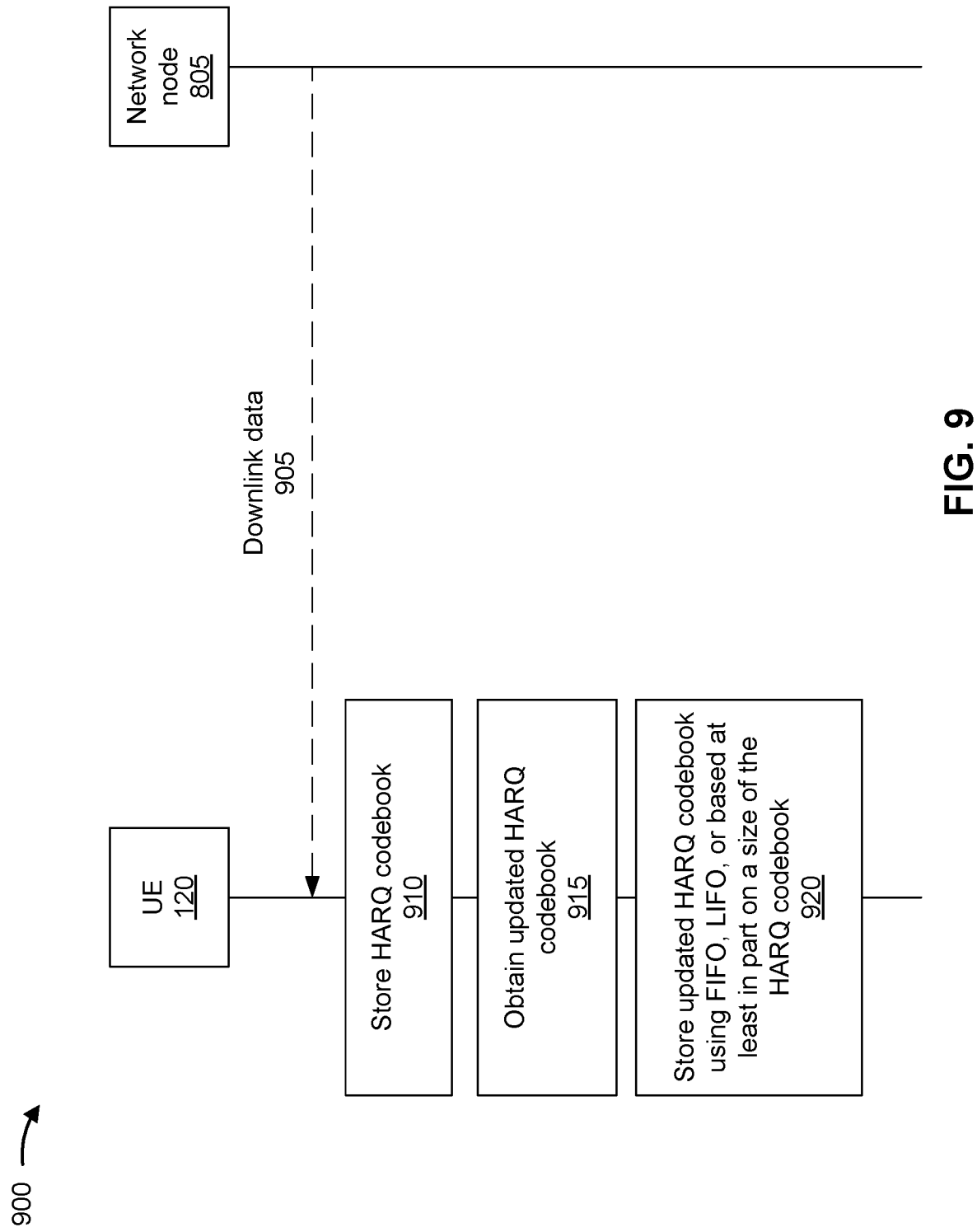
FIG. 9 is a diagram illustrating an example associated with HARQ codebook storage, in accordance with the present disclosure.

FIG. 9 is a diagram illustrating an example 900 of HARQ codebook storage, in accordance with the present disclosure.

As shown in connection with reference number 905, the network node 805 may transmit, and the UE 120 may receive, downlink data. The downlink data may include some or all of the downlink data described in connection with FIG. 3.

As shown in connection with reference number 910, the UE 120 may store a HARQ codebook having a plurality of HARQ process identifiers. As described above in the example 600 of FIG. 6, the UE 120 may obtain a HARQ codebook having the following HARQ process identifiers: HARQ Process ID #K, HARQ Process ID #L, HARQ Process ID #M, and HARQ Process ID #N. Each of the HARQ process identifiers may be associated with HARQ codebook content (e.g., an ACK or NACK). For example, HARQ Process ID #K may be associated with an ACK, HARQ Process ID #L may be associated with an ACK, HARQ Process ID #M may be associated with a NACK, and HARQ Process ID #N may be associated with a NACK. The UE 120 may store the HARQ codebook and the associated HARQ codebook content.

As shown in connection with reference number 915, the UE 120 may obtain an updated HARQ codebook. For example, the UE 120 may obtain an updated HARQ codebook where the HARQ Process ID #M has been updated from a NACK (e.g., the previous HARQ codebook content) to a NACK (e.g., the updated HARQ codebook content). In some aspects, the updated HARQ codebook may be obtained based at least in part on the previous HARQ codebook being canceled.

As shown in connection with reference number 920, the UE 120 may store the updated HARQ codebook. The UE

120 may store the updated HARQ codebook using a FIFO storage process, a LIFO storage process, or based at least in part on a size of the HARQ codebook.

In some aspects, the UE 120 may store the HARQ codebook using the FIFO storage process independent of the L1 priority. For example, the earliest HARQ codebook may be removed from the list of saved HARQ codebooks first, independent of the L1 priority.

In some aspects, the UE 120 may store the HARQ codebook using the FIFO storage process and based at least in part on the L1 priority. For example, one or more earliest HARQ codebooks may be removed from the list of saved HARQ codebooks first. However, a low priority HARQ codebook may be removed before a high priority HARQ codebook, even if the high priority HARQ codebook was saved before the low priority HARQ codebook.

In some aspects, the UE 120 may store the HARQ codebook using the LIFO storage process independent of the L1 priority. For example, the latest HARQ codebook may be removed from the list of saved HARQ codebooks first, independent of the L1 priority.

In some aspects, the UE 120 may store the HARQ codebook using the LIFO storage process and based at least in part on the L1 priority. For example, one or more latest HARQ codebooks may be removed from the list of saved HARQ codebooks first. However, a low priority HARQ codebook may be removed before a high priority HARQ codebook, even if the high priority HARQ codebook was saved after the low priority HARQ codebook.

In some aspects, the UE 120 may drop (e.g., delete) a larger HARQ codebook before dropping a smaller HARQ codebook. The UE 120 may drop the larger HARQ codebook first, independent of the L1 priority.

In some aspects, the UE 120 may drop (e.g., delete) a smaller HARQ codebook before dropping a larger HARQ codebook. The UE 120 may drop the smaller HARQ codebook first, independent of the L1 priority.

In some aspects, the UE 120 may store or drop the HARQ codebooks using a combination of the processes described above.

As indicated above, FIG. 9 is provided as an example. Other examples may differ from what is described with regard to FIG. 9.

Figure 10:
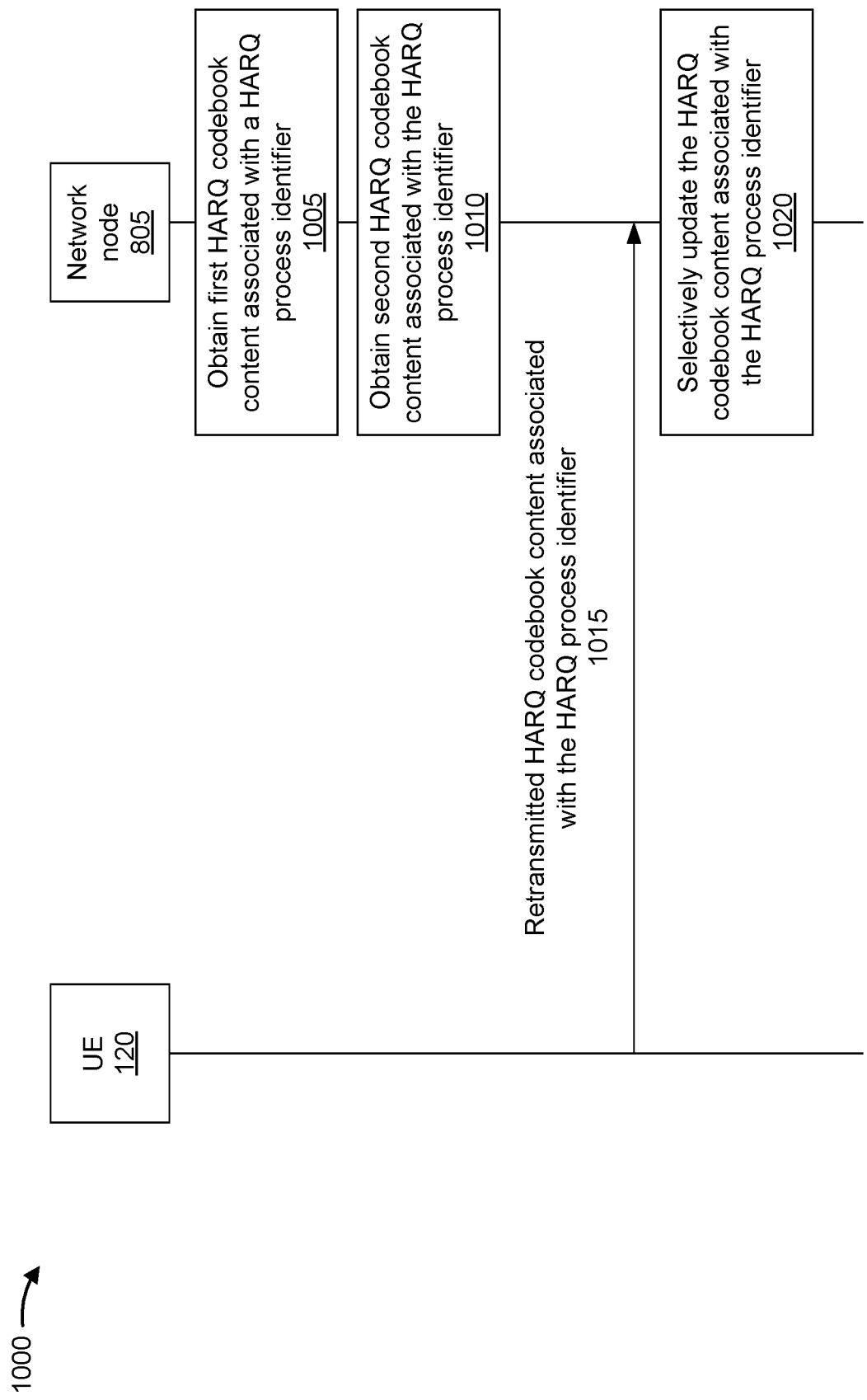
FIG. 10 is a diagram illustrating an example associated with HARQ codebook content updating, in accordance with the present disclosure.

FIG. 10 is a diagram illustrating an example 1000 of HARQ codebook content updating, in accordance with the present disclosure.

As shown in connection with reference number 1005, the network node 805 may obtain first HARQ codebook content associated with a HARQ process identifier. For example, the network node 805 may receive the first HARQ codebook content from the UE 120. The first HARQ codebook content may include the "previous" or "canceled" HARQ codebook content described herein.

As shown in connection with reference number 1010, the network node 805 may obtain second HARQ codebook content associated with the HARQ process identifier. For example, the network node 805 may receive the second HARQ codebook content from the UE 120. The second HARQ codebook content may include the "updated" HARQ codebook content described herein.

As shown in connection with reference number 1015, the network node 805 may receive (e.g., from the UE 120) retransmitted HARQ codebook content. In some aspects, the UE 120 may retransmit the canceled HARQ codebook content, as described above in connection with FIG. 6.

As shown in connection with reference number 1020, the network node 805 may selectively update the HARQ codebook content associated with the HARQ process identifier. In some aspects, the network node 805 may need to keep track of the HARQ process identifiers that have changed, so as to ignore the HARQ process identifier content of the HARQ process identifiers that have changed. For example, the network node 805 may determine not to update the HARQ codebook content (e.g., from NACK to ACK) for a HARQ process identifier that has already been updated. In some aspects, the network node 805 may not be able to request retransmission of a HARQ codebook if the contents of the HARQ codebook have changed. For example, the network node 805 may obtain an indication that the network node 805 is not allowed to request retransmission of a HARQ codebook associated with a range of HARQ process identifiers.

In some aspects, the network node 805 may transmit, and the UE 120 may receive, a request for HARQ codebook content that is not available at the UE 120. For example, the HARQ codebook content may have been canceled. In this case, the UE 120 may not retransmit anything in response to a HARQ codebook retransmission request. This may be considered an error case.

As indicated above, FIG. 10 is provided as an example. Other examples may differ from what is described with regard to FIG. 10.

Figure 11:
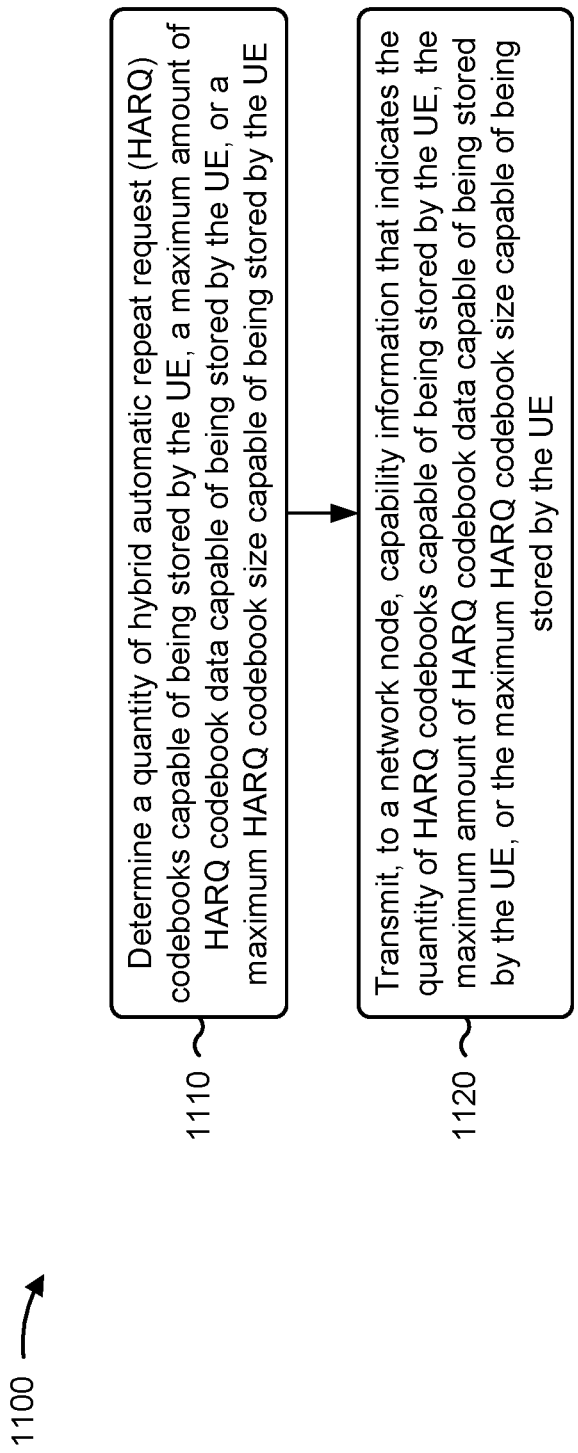
FIG. 11 is a diagram illustrating an example process associated with capability information for HARQ codebook transmission, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with HARQ codebook transmission.

As shown in FIG. 11, in some aspects, process 1100 may include determining a quantity of HARQ codebooks capable of being stored by the UE, a maximum amount of HARQ codebook data capable of being stored by the UE, or a maximum HARQ codebook size capable of being stored by the UE (block 1110). For example, the device (e.g., using communication manager 140 and/or identification component 1508, depicted in FIG. 15) may determine a quantity of HARQ codebooks capable of being stored by the UE, a maximum amount of HARQ codebook data capable of being stored by the UE, or a maximum HARQ codebook size capable of being stored by the UE, as described above.

As further shown in FIG. 11, in some aspects, process 1100 may include transmitting, to a network node, capability information that indicates a quantity of HARQ codebooks capable of being stored by the UE, a maximum amount of HARQ codebook data capable of being stored by the UE, or a maximum HARQ codebook size capable of being stored by the UE (block 1120). For example, the UE (e.g., using communication manager 140 and/or transmission component 1504, depicted in FIG. 15) may transmit, to a network node, capability information that indicates a quantity of HARQ codebooks capable of being stored by the UE, a maximum amount of HARQ codebook data capable of being stored by the UE, or a maximum HARQ codebook size capable of being stored by the UE, as described above.

Process 1100 may include additional aspects, such as any single aspect or any combination of aspects described below and/or in connection with one or more other processes described elsewhere herein.

In a first aspect, transmitting the capability information comprises transmitting capability information, for each of a first storage type and a second storage type, that indicates the quantity of HARQ codebooks capable of being stored by the UE, the maximum amount of HARQ codebook data capable of being stored by the UE, or the maximum HARQ codebook size capable of being stored by the UE.

In a second aspect, alone or in combination with the first aspect, the first storage type includes one or more HARQ process identifiers associated with one or more HARQ processes of the HARQ codebook.

In a third aspect, alone or in combination with one or more of the first and second aspects, process 1100 includes receiving, from the network node, a HARQ codebook retransmission request, identifying the one or more HARQ processes associated with the HARQ codebook retransmission request, obtaining HARQ codebook content using a HARQ process identifier associated with the one or more HARQ processes, and transmitting, to the network node, the HARQ codebook content.

In a fourth aspect, alone or in combination with one or more of the first through third aspects, process 1100 includes obtaining, prior to transmitting the HARQ codebook content, updated HARQ codebook content associated with the HARQ process identifier, wherein transmitting the HARQ codebook content comprises transmitting the updated HARQ codebook content.

In a fifth aspect, alone or in combination with one or more of the first through fourth aspects, the HARQ codebook content includes an acknowledgement message or a negative acknowledgement message.

In a sixth aspect, alone or in combination with one or more of the first through fifth aspects, the second storage type includes HARQ codebook content for one or more HARQ processes of the HARQ codebook.

In a seventh aspect, alone or in combination with one or more of the first through sixth aspects, process 1100 includes receiving, from the network node, a HARQ codebook retransmission request, and transmitting HARQ codebook content for the one or more HARQ processes of the HARQ codebook.

In an eighth aspect, alone or in combination with one or more of the first through seventh aspects, process 1100 includes obtaining, prior to transmitting the HARQ codebook content, updated HARQ codebook content associated with the HARQ codebook, wherein transmitting the HARQ codebook content comprises transmitting previous HARQ codebook content that was associated with the HARQ codebook prior to obtaining the updated HARQ codebook content.

In a ninth aspect, alone or in combination with one or more of the first through eighth aspects, the HARQ codebook content includes an acknowledgement message or a negative acknowledgement message.

In a tenth aspect, alone or in combination with one or more of the first through ninth aspects, the second storage type further includes a HARQ process identifier for each of the one or more HARQ processes.

In an eleventh aspect, alone or in combination with one or more of the first through tenth aspects, process 1100 includes transmitting, to the network node, an indication of whether the UE supports the first storage type or the second storage type.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
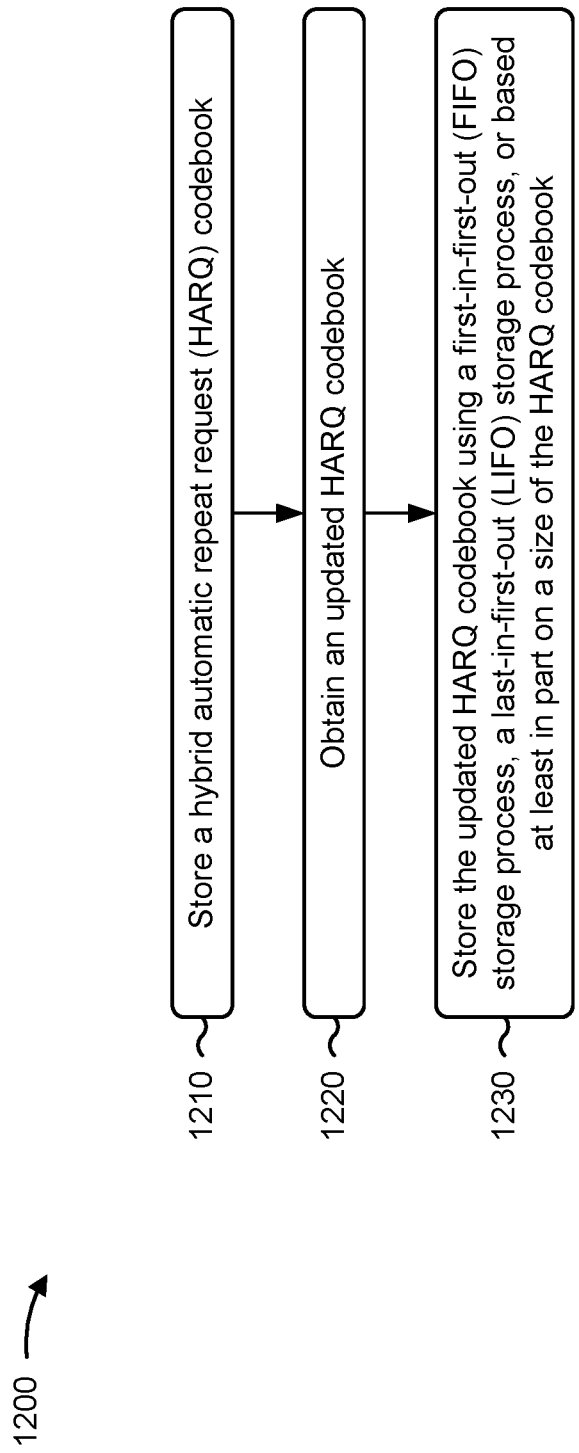
FIG. 12 is a diagram illustrating an example process associated with HARQ codebook storage, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with HARQ codebook transmission.

As shown in FIG. 12, in some aspects, process 1200 may include storing a HARQ codebook (block 1210). For example, the UE (e.g., using communication manager 140 and/or storing component 1512, depicted in FIG. 15) may store a HARQ codebook, as described above.

As further shown in FIG. 12, in some aspects, process 1200 may include obtaining an updated HARQ codebook (block 1220). For example, the UE (e.g., using communication manager 140 and/or obtaining component 1150, depicted in FIG. 15) may obtain an updated HARQ codebook, as described above.

As further shown in FIG. 12, in some aspects, process 1200 may include storing the updated HARQ codebook using a FIFO storage process, a LIFO storage process, or based at least in part on a size of the HARQ codebook (block 1230). For example, the UE (e.g., using communication manager 140 and/or storing component 1512, depicted in FIG. 15) may store the updated HARQ codebook using a FIFO storage process, a LIFO storage process, or based at least in part on a size of the HARQ codebook, as described above.

Process 1200 may include additional aspects, such as any single aspect or any combination of aspects described below and/or in connection with one or more other processes described elsewhere herein.

In a first aspect, storing the updated HARQ codebook comprises storing the updated HARQ codebook using the FIFO storage process independent of a Layer 1 priority of the HARQ codebook.

In a second aspect, alone or in combination with the first aspect, storing the updated HARQ codebook comprises storing the updated HARQ codebook using the FIFO storage process and based at least in part on a Layer 1 priority of the HARQ codebook.

In a third aspect, alone or in combination with one or more of the first and second aspects, storing the updated HARQ codebook comprises storing the updated HARQ codebook using the LIFO storage process independent of a Layer 1 priority of the HARQ codebook.

In a fourth aspect, alone or in combination with one or more of the first through third aspects, storing the updated HARQ codebook comprises storing the updated HARQ codebook using the LIFO storage process and based at least in part on a Layer 1 priority of the HARQ codebook.

In a fifth aspect, alone or in combination with one or more of the first through fourth aspects, storing the updated HARQ codebook comprises dropping a larger HARQ codebook prior to dropping a smaller HARQ codebook.

In a sixth aspect, alone or in combination with one or more of the first through fifth aspects, storing the updated HARQ codebook comprises dropping a smaller HARQ codebook prior to dropping larger a HARQ codebook.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
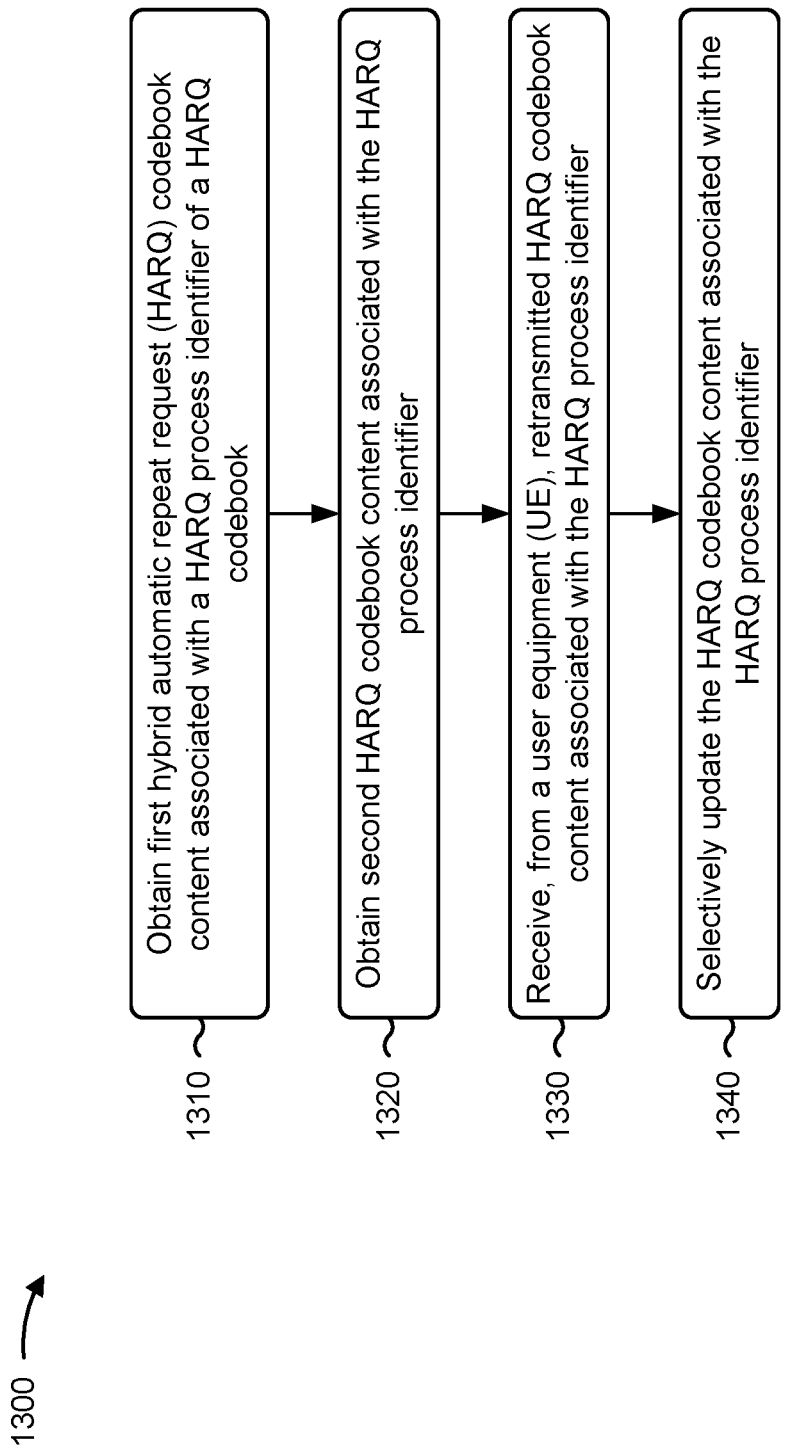
FIG. 13 is a diagram illustrating a first example process associated with HARQ codebook content updating, in accordance with the present disclosure.

FIG. 13 is a diagram illustrating an example process 1300 performed, for example, by a network node, in accordance with the present disclosure. Example process 1300 is an example where the network node (e.g., network node 805) performs operations associated with HARQ codebook transmission.

As shown in FIG. 13, in some aspects, process 1300 may include obtaining first HARQ codebook content associated with a HARQ process identifier of a HARQ codebook (block 1310). For example, the network node (e.g., using communication manager 150 and/or obtaining component 1608, depicted in FIG. 16) may obtain first HARQ codebook content associated with a HARQ process identifier of a HARQ codebook, as described above.

As further shown in FIG. 13, in some aspects, process 1300 may include obtaining second HARQ codebook content associated with the HARQ process identifier (block 1320). For example, the network node (e.g., using communication manager 150 and/or obtaining component 1608, depicted in FIG. 16) may obtain second HARQ codebook content associated with the HARQ process identifier, as described above.

As further shown in FIG. 13, in some aspects, process 1300 may include receiving, from a UE, retransmitted HARQ codebook content associated with the HARQ process identifier (block 1330). For example, the network node (e.g., using communication manager 150 and/or reception component 1602, depicted in FIG. 16) may receive, from a UE, retransmitted HARQ codebook content associated with the HARQ process identifier, as described above.

As further shown in FIG. 13, in some aspects, process 1300 may include selectively updating the HARQ codebook content associated with the HARQ process identifier (block 1340). For example, the network node (e.g., using communication manager 150 and/or updating component 1610, depicted in FIG. 16) may selectively update the HARQ codebook content associated with the HARQ process identifier, as described above.

Process 1300 may include additional aspects, such as any single aspect or any combination of aspects described below and/or in connection with one or more other processes described elsewhere herein.

In a first aspect, selectively updating the HARQ codebook content comprises determining not to update the HARQ codebook content associated with the HARQ process identifier from the second HARQ codebook content to the retransmitted HARQ codebook content.

In a second aspect, alone or in combination with the first aspect, the retransmitted HARQ codebook content is the first HARQ codebook content.

In a third aspect, alone or in combination with one or more of the first and second aspects, process 1300 includes transmitting, to the UE, a retransmission request for the HARQ codebook associated with the HARQ process identifier, and receiving the retransmitted HARQ codebook content based at least in part on the retransmission request.

In a fourth aspect, alone or in combination with one or more of the first through third aspects, process 1300 includes obtaining an indication that the network node is not allowed to request retransmission of the HARQ codebook associated with the HARQ process identifier.

In a fifth aspect, alone or in combination with one or more of the first through fourth aspects, the HARQ codebook content includes an acknowledgement message or a negative acknowledgement message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
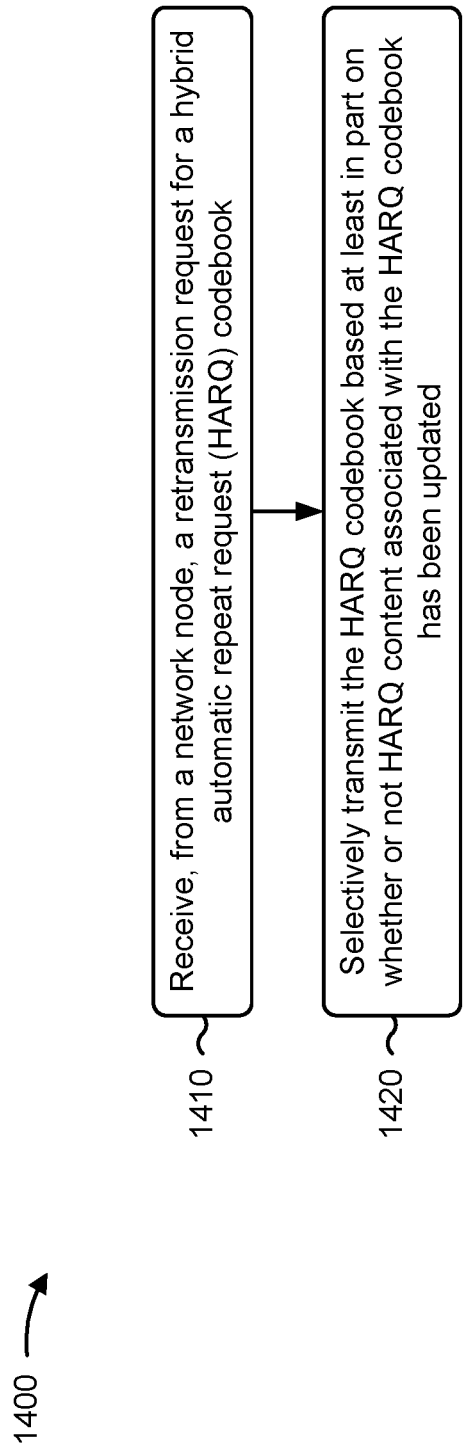
FIG. 14 is a diagram illustrating a second example process associated with HARQ codebook content updating, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with HARQ codebook transmission.

As shown in FIG. 14, in some aspects, process 1400 may include receiving, from a network node, a retransmission request for a HARQ codebook (block 1410). For example, the UE (e.g., using communication manager 140 and/or reception component 1502, depicted in FIG. 15) may receive, from a network node, a retransmission request for a HARQ codebook, as described above.

As further shown in FIG. 14, in some aspects, process 1400 may include selectively transmitting the HARQ codebook based at least in part on whether HARQ content associated with the HARQ codebook has been updated (block 1420). For example, the UE (e.g., using communication manager 140 and/or transmission component 1504, depicted in FIG. 15) may selectively transmit the HARQ codebook based at least in part on whether HARQ content associated with the HARQ codebook has been updated, as described above.

Process 1400 may include additional aspects, such as any single aspect or any combination of aspects described below and/or in connection with one or more other processes described elsewhere herein.

In a first aspect, selectively transmitting the HARQ codebook comprises determining not to transmit the HARQ codebook based at least in part on the HARQ content having been updated.

In a second aspect, alone or in combination with the first aspect, selectively transmitting the HARQ codebook comprises selectively transmitting the HARQ based at least in part on whether the HARQ codebook content has been updated within a time period.

In a third aspect, alone or in combination with one or more of the first and second aspects, process 1400 includes storing one or more HARQ process identifiers associated with the HARQ codebook.

In a fourth aspect, alone or in combination with one or more of the first through third aspects, process 1400 includes storing the HARQ codebook content associated with the HARQ codebook.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
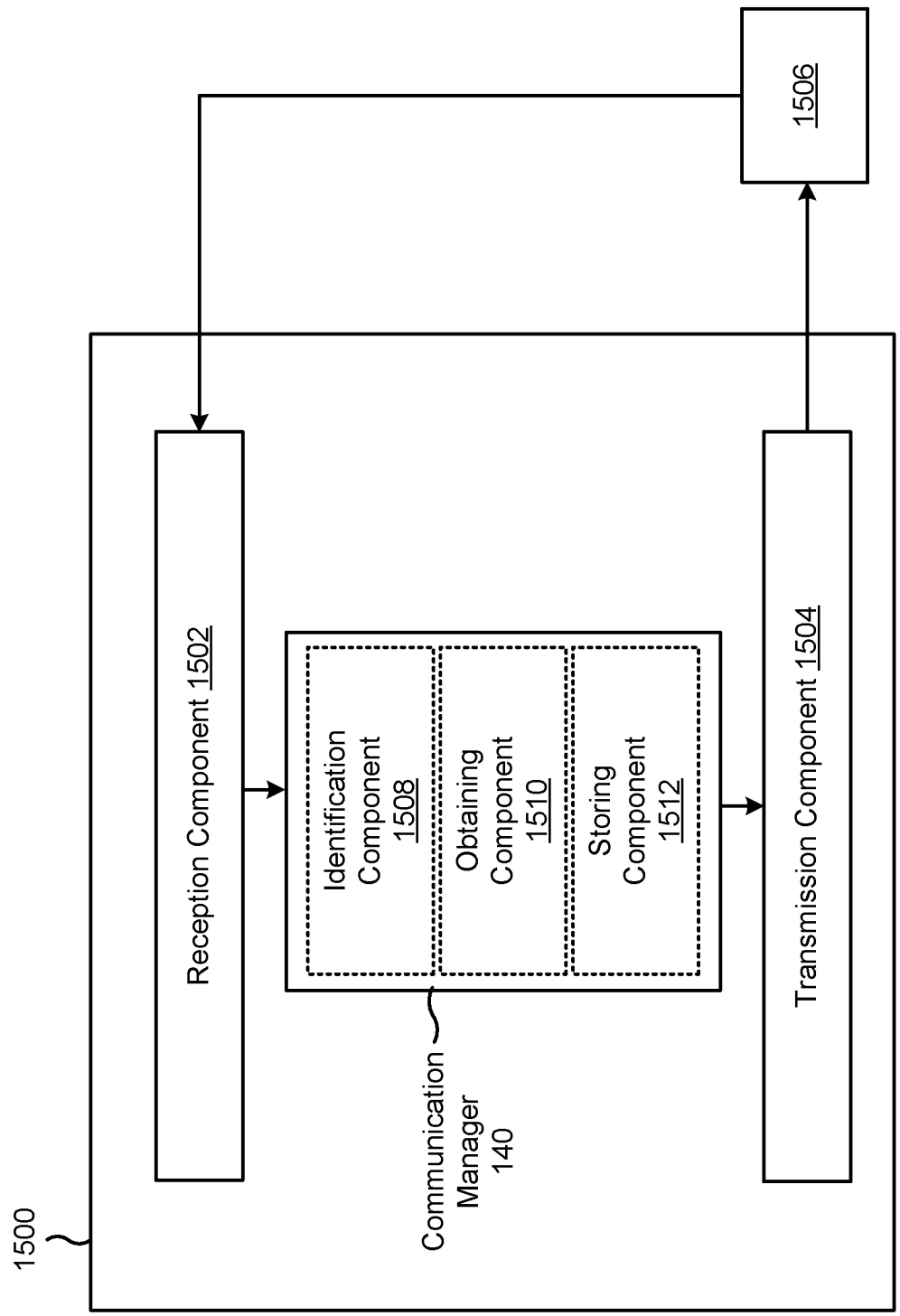
FIG. 15 is a diagram of an example apparatus for wireless communication, in accordance with the present disclosure.

FIG. 15 is a diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include one or more of an identification component 1508, an obtaining component 1150, or a storing component 1512, among other examples.

In some aspects, the apparatus 1500 may be configured to perform one or more operations described herein in connection with FIGS. 5-10. Additionally, or alternatively, the apparatus 1500 may be configured to perform one or more processes described herein, such as process 1100 of FIG. 11, process 1200 of FIG. 12, process 1400 of FIG. 14, or a combination thereof. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The identification component 1508 may determine a quantity of HARQ codebooks capable of being stored by the UE, a maximum amount of HARQ codebook data capable of being stored by the UE, or a maximum HARQ codebook size capable of being stored by the UE.

The transmission component 1504 may transmit, to a network node, capability information that indicates the quantity of HARQ codebooks capable of being stored by the UE, the maximum amount of HARQ codebook data capable of being stored by the UE, or the maximum HARQ codebook size capable of being stored by the UE.

The reception component 1502 may receive, from the network node, a HARQ codebook retransmission request. The identification component 1508 may identify the one or more HARQ processes associated with the HARQ codebook retransmission request. The obtaining component 1150 may obtain HARQ codebook content using a HARQ process identifier associated with the one or more HARQ processes. The transmission component 1504 may transmit, to the network node, the HARQ codebook content.

The obtaining component 1150 may obtain, prior to transmitting the HARQ codebook content, updated HARQ codebook content associated with the HARQ process identifier wherein transmitting the HARQ codebook content comprises transmitting the updated HARQ codebook content.

The reception component 1502 may receive, from the network node, a HARQ codebook retransmission request. The transmission component 1504 may transmit HARQ codebook content for the one or more HARQ processes of the HARQ codebook.

The obtaining component 1150 may obtain, prior to transmitting the HARQ codebook content, updated HARQ codebook content associated with the HARQ codebook wherein transmitting the HARQ codebook content comprises transmitting previous HARQ codebook content that was associated with the HARQ codebook prior to obtaining the updated HARQ codebook content.

The transmission component 1504 may transmit, to the network node, an indication of whether the UE supports the first storage type or the second storage type.

The storing component 1512 may store a HARQ codebook. The obtaining component 1150 may obtain an updated HARQ codebook. The storing component 1512 may store the updated HARQ codebook using a FIFO storage process, a LIFO storage process, or based at least in part on a size of the HARQ codebook.

The reception component 1502 may receive, from a network node, a retransmission request for a HARQ codebook. The transmission component 1504 may selectively transmit the HARQ codebook based at least in part on whether HARQ content associated with the HARQ codebook has been updated.

The storing component 1512 may store one or more HARQ process identifiers associated with the HARQ codebook.

The storing component 1512 may store the HARQ codebook content associated with the HARQ codebook.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
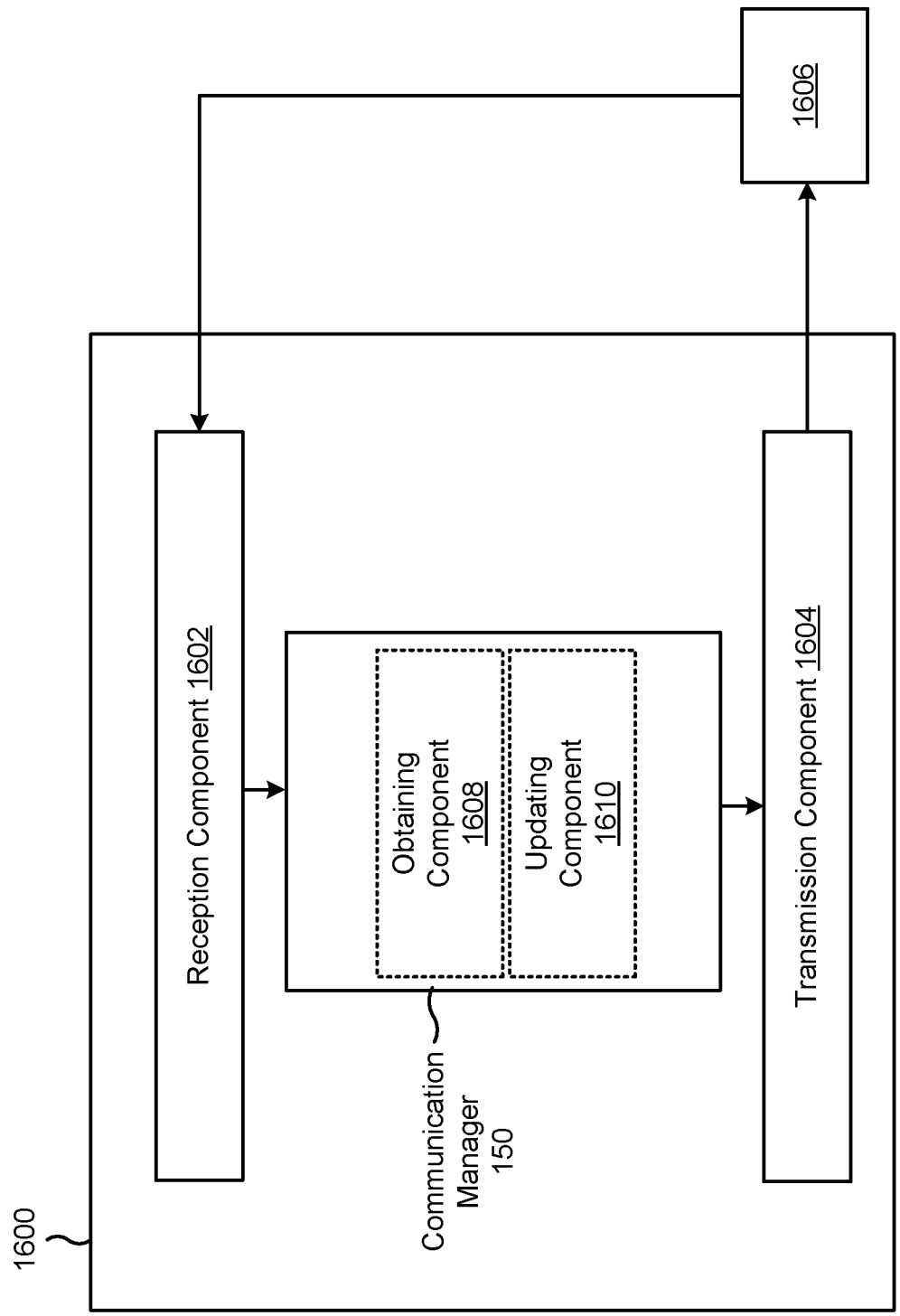
FIG. 16 is a diagram of an example apparatus for wireless communication, in accordance with the present disclosure.

FIG. 16 is a diagram of an example apparatus 1600 for wireless communication. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include one or more of an obtaining component 1608, or an updating component 1610, among other examples.

In some aspects, the apparatus 1600 may be configured to perform one or more operations described herein in connection with FIGS. 5-10. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The obtaining component 1608 may obtain first HARQ codebook content associated with a HARQ process identifier of a HARQ codebook. The obtaining component 1608 may obtain second HARQ codebook content associated with the HARQ process identifier. The reception component 1602 may receive, from a UE, retransmitted HARQ codebook content associated with the HARQ process identifier. The updating component 1610 may selectively update the HARQ codebook content associated with the HARQ process identifier.

The transmission component 1604 may transmit, to the UE, a retransmission request for the HARQ codebook associated with the HARQ process identifier.

The reception component 1602 may receive the retransmitted HARQ codebook content based at least in part on the retransmission request.

The obtaining component 1608 may obtain an indication that the network node is not allowed to request retransmission of the HARQ codebook associated with the HARQ process identifier.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: determining a quantity of hybrid automatic repeat request (HARQ) codebooks capable of being stored by the UE, a maximum amount of HARQ codebook data capable of being stored by the UE, or a maximum HARQ codebook size capable of being stored by the UE; and transmitting, to a network node, capability information that indicates the quantity of HARQ codebooks capable of being stored by the UE, the maximum amount of HARQ codebook data capable of being stored by the UE, or the maximum HARQ codebook size capable of being stored by the UE.

Aspect 2: The method of Aspect 1, wherein transmitting the capability information comprises: transmitting capability information, for each of a first storage type and a second storage type, that indicates the quantity of HARQ codebooks capable of being stored by the UE, the maximum amount of HARQ codebook data capable of being stored by the UE, or the maximum HARQ codebook size capable of being stored by the UE.

Aspect 3: The method of Aspect 2, wherein the first storage type includes one or more HARQ process identifiers associated with one or more HARQ processes of the HARQ codebook.

Aspect 4: The method of Aspect 3, further comprising: receiving, from the network node, a HARQ codebook retransmission request; identifying the one or more HARQ processes associated with the HARQ codebook retransmission request; obtaining HARQ codebook content using a HARQ process identifier associated with the one or more HARQ processes; and transmitting, to the network node, the HARQ codebook content.

Aspect 5: The method of Aspect 4, further comprising: obtaining, prior to transmitting the HARQ codebook content, updated HARQ codebook content associated with the HARQ process identifier, wherein transmitting the HARQ codebook content comprises transmitting the updated HARQ codebook content.

Aspect 6: The method of Aspect 4, wherein the HARQ codebook content includes an acknowledgement message or a negative acknowledgement message.

Aspect 7: The method of Aspect 2, wherein the second storage type includes HARQ codebook content for one or more HARQ processes of the HARQ codebook.

Aspect 8: The method of Aspect 7, further comprising: receiving, from the network node, a HARQ codebook retransmission request; and transmitting HARQ codebook content for the one or more HARQ processes of the HARQ codebook.

Aspect 9: The method of Aspect 7, further comprising: obtaining, prior to transmitting the HARQ codebook content, updated HARQ codebook content associated with the HARQ codebook, wherein transmitting the HARQ codebook content comprises transmitting previous HARQ codebook content that was associated with the HARQ codebook prior to obtaining the updated HARQ codebook content.

Aspect 10: The method of Aspect 7, wherein the HARQ codebook content includes an acknowledgement message or a negative acknowledgement message.

Aspect 11: The method of Aspect 7, wherein the second storage type further includes a HARQ process identifier for each of the one or more HARQ processes.

Aspect 12: The method of Aspect 2, further comprising transmitting, to the network node, an indication of whether the UE supports the first storage type or the second storage type.

Aspect 13: A method of wireless communication performed by a user equipment (UE), comprising: storing a hybrid automatic repeat request (HARQ) codebook; obtaining an updated HARQ codebook; and storing the updated HARQ codebook using a first-in-first-out (FIFO) storage process, a last-in-first-out (LIFO) storage process, or based at least in part on a size of the HARQ codebook.

Aspect 14: The method of Aspect 13, wherein storing the updated HARQ codebook comprises: storing the updated HARQ codebook using the FIFO storage process independent of a Layer 1 priority of the HARQ codebook.

Aspect 15: The method of any of Aspects 13-14, wherein storing the updated HARQ codebook comprises: storing the updated HARQ codebook using the FIFO storage process and based at least in part on a Layer 1 priority of the HARQ codebook.

Aspect 16: The method of any of Aspects 13-15, wherein storing the updated HARQ codebook comprises: storing the updated HARQ codebook using the LIFO storage process independent of a Layer 1 priority of the HARQ codebook.

Aspect 17: The method of any of Aspects 13-16, wherein storing the updated HARQ codebook comprises: storing the updated HARQ codebook using the LIFO storage process and based at least in part on a Layer 1 priority of the HARQ codebook.

Aspect 18: The method of any of Aspects 13-17, wherein storing the updated HARQ codebook comprises: dropping a larger HARQ codebook prior to dropping a smaller HARQ codebook.

Aspect 19: The method of any of Aspects 13-18, wherein storing the updated HARQ codebook comprises: dropping a smaller HARQ codebook prior to dropping larger a HARQ codebook.

Aspect 20: A method of wireless communication performed by a network node, comprising: obtaining first hybrid automatic repeat request (HARQ) codebook content associated with a HARQ process identifier of a HARQ codebook; obtaining second HARQ codebook content associated with the HARQ process identifier; receiving, from a user equipment (UE), retransmitted HARQ codebook content associated with the HARQ process identifier; and selectively updating the HARQ codebook content associated with the HARQ process identifier.

Aspect 21: The method of Aspect 20, wherein selectively updating the HARQ codebook content comprises determining not to update the HARQ codebook content associated with the HARQ process identifier from the second HARQ codebook content to the retransmitted HARQ codebook content.

Aspect 22: The method of any of Aspects 20-21, wherein the retransmitted HARQ codebook content is the first HARQ codebook content.

Aspect 23: The method of any of Aspects 20-22, further comprising: transmitting, to the UE, a retransmission request for the HARQ codebook associated with the HARQ process identifier; and receiving the retransmitted HARQ codebook content based at least in part on the retransmission request.

Aspect 24: The method of any of Aspects 20-23, further comprising obtaining an indication that the network node is not allowed to request retransmission of the HARQ codebook associated with the HARQ process identifier.

Aspect 25: The method of any of Aspects 20-24, wherein the HARQ codebook content includes an acknowledgement message or a negative acknowledgement message.

Aspect 26: A method of wireless communication performed by a user equipment (UE), comprising: receiving, from a network node, a retransmission request for a hybrid automatic repeat request (HARQ) codebook; and selectively transmitting the HARQ codebook based at least in part on whether HARQ content associated with the HARQ codebook has been updated.

Aspect 27: The method of Aspect 26, wherein selectively transmitting the HARQ codebook comprises determining not to transmit the HARQ codebook based at least in part on the HARQ content having been updated.

Aspect 28: The method of any of Aspects 26-27, wherein selectively transmitting the HARQ codebook comprises selectively transmitting the HARQ based at least in part on whether the HARQ codebook content has been updated within a time period.

Aspect 29: The method of any of Aspects 26-28, further comprising storing one or more HARQ process identifiers associated with the HARQ codebook.

Aspect 30: The method of any of Aspects 26-29, further comprising storing the HARQ codebook content associated with the HARQ codebook.

Aspect 31: An apparatus for wireless communication at a device, comprising a processor; memory coupled with the processor; and instructions stored in the memory and executable by the processor to cause the apparatus to perform the method of one or more of Aspects 1-12.

Aspect 32: A device for wireless communication, comprising a memory and one or more processors coupled to the memory, the one or more processors configured to perform the method of one or more of Aspects 1-12.

Aspect 33: An apparatus for wireless communication, comprising at least one means for performing the method of one or more of Aspects 1-12.

Aspect 34: A non-transitory computer-readable medium storing code for wireless communication, the code comprising instructions executable by a processor to perform the method of one or more of Aspects 1-12.

Aspect 35: A non-transitory computer-readable medium storing a set of instructions for wireless communication, the set of instructions comprising one or more instructions that, when executed by one or more processors of a device, cause the device to perform the method of one or more of Aspects 1-12.

Aspect 36: An apparatus for wireless communication at a device, comprising a processor; memory coupled with the processor; and instructions stored in the memory and executable by the processor to cause the apparatus to perform the method of one or more of Aspects 13-19.

Aspect 37: A device for wireless communication, comprising a memory and one or more processors coupled to the memory, the one or more processors configured to perform the method of one or more of Aspects 13-19.

Aspect 38: An apparatus for wireless communication, comprising at least one means for performing the method of one or more of Aspects 13-19.

Aspect 39: A non-transitory computer-readable medium storing code for wireless communication, the code comprising instructions executable by a processor to perform the method of one or more of Aspects 13-19.

Aspect 40: A non-transitory computer-readable medium storing a set of instructions for wireless communication, the set of instructions comprising one or more instructions that, when executed by one or more processors of a device, cause the device to perform the method of one or more of Aspects 13-19.

Aspect 41: An apparatus for wireless communication at a device, comprising a processor; memory coupled with the processor; and instructions stored in the memory and executable by the processor to cause the apparatus to perform the method of one or more of Aspects 20-25.

Aspect 42: A device for wireless communication, comprising a memory and one or more processors coupled to the memory, the one or more processors configured to perform the method of one or more of Aspects 20-25

Aspect 43: An apparatus for wireless communication, comprising at least one means for performing the method of one or more of Aspects 20-25.

Aspect 44: A non-transitory computer-readable medium storing code for wireless communication, the code comprising instructions executable by a processor to perform the method of one or more of Aspects 20-25.

Aspect 45: A non-transitory computer-readable medium storing a set of instructions for wireless communication, the set of instructions comprising one or more instructions that, when executed by one or more processors of a device, cause the device to perform the method of one or more of Aspects 20-25.

Aspect 46: An apparatus for wireless communication at a device, comprising a processor; memory coupled with the processor; and instructions stored in the memory and executable by the processor to cause the apparatus to perform the method of one or more of Aspects 26-30.

Aspect 47: A device for wireless communication, comprising a memory and one or more processors coupled to the memory, the one or more processors configured to perform the method of one or more of Aspects 26-30.

Aspect 48: An apparatus for wireless communication, comprising at least one means for performing the method of one or more of Aspects 26-30.

Aspect 49: A non-transitory computer-readable medium storing code for wireless communication, the code comprising instructions executable by a processor to perform the method of one or more of Aspects 26-30.

Aspect 50: A non-transitory computer-readable medium storing a set of instructions for wireless communication, the set of instructions comprising one or more instructions that, when executed by one or more processors of a device, cause the device to perform the method of one or more of Aspects 26-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
determine a maximum amount of hybrid automatic repeat request (HARQ) codebook data capable of being stored by the UE, or a maximum HARQ codebook size capable of being stored by the UE;
transmit, to a network node, capability information that indicates the maximum amount of HARQ codebook data capable of being stored by the UE, or the maximum HARQ codebook size capable of being stored by the UE; and
transmit, based at least on transmitting the capability information, previous HARQ codebook content that was associated with the HARQ codebook.

2. The apparatus of claim 1, wherein the one or more processors, to transmit the capability information, are configured to:
transmit capability information, for each of a first storage type and a second storage type, that indicates the maximum amount of HARQ codebook data capable of being stored by the UE, or the maximum HARQ codebook size capable of being stored by the UE.

3. The apparatus of claim 1, wherein the capability information is associated with a particular storage type that includes HARQ codebook content for one or more HARQ processes of a HARQ codebook.

4. The apparatus of claim 3, wherein the one or more processors are further configured to:
receive, from the network node, a HARQ codebook retransmission request; and
transmit HARQ codebook content for the one or more HARQ processes of the HARQ codebook.

5. The apparatus of claim 3, wherein the HARQ codebook content includes an acknowledgement message or a negative acknowledgement message.

6. The apparatus of claim 3, wherein the particular storage type further includes a HARQ process identifier for each of the one or more HARQ processes.

7. The apparatus of claim 1, wherein the one or more processors, to determine the maximum amount of HARQ codebook data capable of being stored by the UE, or the maximum HARQ codebook size capable of being stored by the UE, are configured to:
determine the maximum amount of HARQ codebook data capable of being stored by the UE, or the maximum HARQ codebook size capable of being stored by the UE, based at least in part on a total storage capability of the UE, an available storage capability of the UE, or a configuration of the UE.

8. An apparatus for wireless communication at a user equipment (UE), comprising:
one or more memories; and
one or more processors, coupled to the one or more memories, configured to:
store a hybrid automatic repeat request (HARQ) codebook;
obtain an updated HARQ codebook; and
store the updated HARQ codebook using a first-in-first-out (FIFO) storage process, a last-in-first-out (LIFO) storage process, or based at least in part on a size of the HARQ codebook.

9. The apparatus of claim 8, wherein the one or more processors, to store the updated HARQ codebook, are configured to:
store the updated HARQ codebook using the FIFO storage process independent of a Layer 1 priority of the HARQ codebook.

10. The apparatus of claim 8, wherein the one or more processors, to store the updated HARQ codebook, are configured to:
store the updated HARQ codebook using the FIFO storage process and based at least in part on a Layer 1 priority of the HARQ codebook.

11. The apparatus of claim 8, wherein the one or more processors, to store the updated HARQ codebook, are configured to:
store the updated HARQ codebook using the LIFO storage process independent of a Layer 1 priority of the HARQ codebook.

12. The apparatus of claim 8, wherein the one or more processors, to store the updated HARQ codebook, are configured to:
store the updated HARQ codebook using the LIFO storage process and based at least in part on a Layer 1 priority of the HARQ codebook.

13. The apparatus of claim 8, wherein the one or more processors, to store the updated HARQ codebook, are configured to:
drop a larger HARQ codebook prior to dropping a smaller HARQ codebook.

14. The apparatus of claim 8, wherein the one or more processors, to store the updated HARQ codebook, are configured to:
drop a smaller HARQ codebook prior to dropping larger a HARQ codebook.

15. An apparatus for wireless communication at a network node, comprising:
one or more memories; and
one or more processors, coupled to the one or more memories, configured to:
obtain first hybrid automatic repeat request (HARQ) codebook content associated with a HARQ process identifier of a HARQ codebook;
obtain second HARQ codebook content associated with the HARQ process identifier;
receive, from a user equipment (UE), retransmitted HARQ codebook content associated with the HARQ process identifier; and
selectively update the HARQ codebook content associated with the HARQ process identifier.

16. The apparatus of claim 15, wherein the one or more processors, to selectively update the HARQ codebook content, are configured to determine not to update the HARQ codebook content associated with the HARQ process identifier from the second HARQ codebook content to the retransmitted HARQ codebook content.

17. The apparatus of claim 15, wherein the retransmitted HARQ codebook content is the first HARQ codebook content.

18. The apparatus of claim 15, wherein the one or more processors are further configured to:
transmit, to the UE, a retransmission request for the HARQ codebook associated with the HARQ process identifier; and receive the retransmitted HARQ codebook content based at least in part on the retransmission request.

19. The apparatus of claim 15, wherein the one or more processors are further configured to obtain an indication that the network node is not allowed to request retransmission of the HARQ codebook associated with the HARQ process identifier.

20. The apparatus of claim 19, wherein obtaining the indication that the network node is not allowed to request retransmission of the HARQ codebook associated with the HARQ process identifier comprises obtaining an indication that the network node is not allowed to request retransmission of a HARQ codebook associated with a range of HARQ process identifiers.

21. An apparatus for wireless communication at a user equipment (UE), comprising:
  one or more memories; and
  one or more processors, coupled to the one or more memories, configured to:
    receive, from a network node, a retransmission request for a hybrid automatic repeat request (HARQ) codebook; and
    selectively transmit the HARQ codebook based at least in part on whether HARQ content associated with the HARQ codebook has been updated.

22. The apparatus of claim 21, wherein the one or more processors, to selectively transmit the HARQ codebook, are configured to determine not to transmit the HARQ codebook based at least in part on the HARQ content having been updated.

23. The apparatus of claim 21, wherein the one or more processors, to selectively transmit the HARQ codebook, are configured to selectively transmit the HARQ codebook based at least in part on whether the HARQ content has been updated within a time period.

24. The apparatus of claim 21, wherein the one or more processors are further configured to store one or more HARQ process identifiers associated with the HARQ codebook or the HARQ content associated with the HARQ codebook.

25. A method of wireless communication performed by a user equipment (UE), comprising:
  determining a maximum amount of hybrid automatic repeat request (HARQ) codebook data capable of being stored by the UE, or a maximum HARQ codebook size capable of being stored by the UE;
  transmitting, to a network node, capability information that indicates the maximum amount of HARQ codebook data capable of being stored by the UE, or the maximum HARQ codebook size capable of being stored by the UE; and
  transmitting, based at least on transmitting the capability information, previous HARQ codebook content that was associated with the HARQ codebook.

26. The method of claim 25, wherein transmitting the capability information comprises:
  transmitting capability information, for each of a first storage type and a second storage type, that indicates the maximum amount of HARQ codebook data capable of being stored by the UE, or the maximum HARQ codebook size capable of being stored by the UE.

27. The method of claim 25, wherein the capability information is associated with a particular storage type that includes HARQ codebook content for one or more HARQ processes of a HARQ codebook.

28. The method of claim 27, further comprising:
  receiving, from the network node, a HARQ codebook retransmission request; and
  transmitting HARQ codebook content for the one or more HARQ processes of the HARQ codebook.

29. The method of claim 27, wherein the HARQ codebook content includes an acknowledgement message or a negative acknowledgement message.

30. The method of claim 27, wherein the particular storage type further includes a HARQ process identifier for each of the one or more HARQ processes.

31. The method of claim 25, wherein determining the maximum amount of HARQ codebook data capable of being stored by the UE, or the maximum HARQ codebook size capable of being stored by the UE comprises:
  determining the maximum amount of HARQ codebook data capable of being stored by the UE, or the maximum HARQ codebook size capable of being stored by the UE, based at least in part on a total storage capability of the UE, an available storage capability of the UE, or a configuration of the UE.

\* \* \* \* \*